(12) United States Patent
Presniakov et al.

(10) Patent No.: US 10,126,607 B2
(45) Date of Patent: Nov. 13, 2018

(54) LIQUID CRYSTAL BEAM CONTROL DEVICE

(71) Applicant: LENSVECTOR INC., San Jose, CA (US)

(72) Inventors: Vladimir Presniakov, Quebec (CA); Karen Asatryan, Quebec (CA); Armen Zohrabyan, Quebec (CA); Tigran Galstian, Quebec (CA); Aram Bagramyan, Quebec (CA); Simon Careau, Quebec (CA)

(73) Assignee: LENSVECTOR INC., San Jose, CA (US)

( * ) Notice: Subject to any disclaimer, the term of this patent is extended or adjusted under 35 U.S.C. 154(b) by 0 days.

(21) Appl. No.: 15/913,181

(22) Filed: Mar. 6, 2018

(65) Prior Publication Data

US 2018/0196318 A1  Jul. 12, 2018

Related U.S. Application Data

(63) Continuation-in-part of application No. PCT/CA2016/050589, filed on May 25, 2016.

(60) Provisional application No. 62/487,603, filed on Apr. 20, 2017, provisional application No. 62/217,875, (Continued)

(51) Int. Cl.
 *G02F 1/29* (2006.01)
 *G02F 1/1343* (2006.01)
 *G02F 1/1337* (2006.01)

(52) U.S. Cl.
 CPC ...... *G02F 1/134309* (2013.01); *G02F 1/1337* (2013.01); *G02F 1/29* (2013.01); *G02F 2001/134372* (2013.01); *G02F 2001/134381* (2013.01); *G02F 2203/26* (2013.01); *G02F 2203/50* (2013.01)

(58) Field of Classification Search
 CPC .......... G02F 1/29; G02F 2001/134381; G02F 2001/134372
 See application file for complete search history.

(56) References Cited

U.S. PATENT DOCUMENTS

2008/0284924 A1  11/2008  Hofmann et al.
2010/0208185 A1*  8/2010  Van Bommel ............ G02F 1/29
                                                      349/139

(Continued)

FOREIGN PATENT DOCUMENTS

| CN | 201488912 U | 3/2015 |
| WO | WO 2014/105814 A1 | 7/2014 |
| WO | WO 2014/138974 A1 | 9/2014 |

OTHER PUBLICATIONS

PCT/CA2016/050589 written opinion, dated Sep. 14, 2016.

(Continued)

*Primary Examiner* — Nathanael R Briggs
*Assistant Examiner* — Alexander Gross
(74) *Attorney, Agent, or Firm* — J-TEK Law PLLC; Jeffrey D. Tekanic; Scott T. Wakeman

(57) ABSTRACT

Liquid crystal light beam control devices and their manufacture are described. Beneficial aspects of beam broadening devices employed for controlled illumination and architectural purposes are presented including improving beam divergence control, improving beam broadening dynamic range control, beam divergence preconditioning, improving projected beam intensity uniformity.

25 Claims, 19 Drawing Sheets

Related U.S. Application Data filed on Sep. 12, 2015, provisional application No. 62/242,422, filed on Oct. 16, 2015.

(56) References Cited

U.S. PATENT DOCUMENTS

| | | | |
|---|---|---|---|
| 2015/0268495 A1* | 9/2015 | Kizaki | G02F 1/1337 349/33 |
| 2015/0316820 A1 | 11/2015 | Duston et al. | |
| 2016/0041449 A1 | 2/2016 | Clark et al. | |

OTHER PUBLICATIONS

PCT/CA2016/050589 International search report, dated Sep. 14, 2016.

PCT/CA2016/050589 search strategy, Mar. 16, 2017.

\* cited by examiner

LIQUID CRYSTAL BEAM CONTROL DEVICE

RELATED APPLICATIONS

This patent application is a continuation-in-part of PCT/CA2016/050589 filed May 25, 2016 that claims priority from U.S. Provisional Patent Application Ser. No. 62/217,875 filed Sep. 12, 2015 and from U.S. Provisional Patent Application Ser. No. 62/242,422 filed Oct. 16, 2015, the entireties of which are incorporated herein by reference. This application also claims priority of U.S. Provisional Patent Application Ser. No. 62/487,603 filed Apr. 20, 2017, the entirety of which is incorporated herein by reference.

TECHNICAL FIELD

This patent application relates to liquid crystal (LC) beam control devices and their manufacturing.

BACKGROUND

Liquid crystal beam control devices are known in the art. Some such devices typically use patterned electrodes over an LC cell to create a spatial variation in the index of refraction that is useful to control a beam. To keep voltages low, electrodes can be placed on cell substrates on an inner side or sides thereof. To increase optical performance, the (form factor) size and/or aspect ratio of beam (control) shaping elements, defined mainly by the ratio of the patterned electrodes pitch and the thickness of the LC, should be carefully chosen. Various problems exist, including: a limited degree (extent) of angular control, poor (quality) beam intensity distribution, excessive color separation, high cost of manufacture, unsuitable operation voltage, etc.

However, now specific applications are emerging that might benefit from such elements. There are many examples of such applications, which may be qualified as "dynamic" or "smart" lighting. For example, Light Emitting Diode (LED) sources (with relatively small divergence and emitting surface) are increasingly used in the architectural lighting, automotive industry, etc., but in the large majority of cases the parameters of those illumination systems (such as diffusion, divergence, glares, direction, etc.) are fixed. At the same time, it might be extremely useful, for example, to have a lighting system that might change the divergence angle of the LED illumination system automatically when there is a car moving in the opposed direction (to avoid disturbing its driver). Other examples may be mentioned for optimized residential or general architectural lighting. In addition, with the penetration of Li-Fi technologies (replacing the Wi-Fi by smart LED sources) the ability to controllably steer or broaden light (used both for illumination and connectivity) may be very useful. This is a reason why LC beam control devices become increasingly important.

Usually the efficiency of beam shaping in LCs is defined, first of all, by the optical path difference (or the phase delay $\delta\phi = L \cdot \delta n \cdot 2\pi/\lambda$, where L is the effective thickness, $\delta n$ is the electrically induced refractive index difference and $\lambda$ is the light wavelength in vacuum) undergone by light traversing the LC layer. This difference is limited by the maximal values of optical birefringence $\Delta n$ ($\delta n < \Delta n$) and the thickness L of the LC. The beam shaping efficiency is also inversely proportional to the clear aperture (CA) of the element that is defined by the gap g between various electrode segments. In addition, the non-locality of the electric field distribution (fringing field, etc.) as well as of the reaction of the LC (to that electric field) impose limitations on the choice of the geometrical factors of the cell. Thus, the ratio $r = \delta\phi/CA$ is one (among others) important factor (it contains also the aspect ratio L/CA or L/g). That is the reason why the thickness of the LC layer and the gaps g must be chosen in a way to increase the efficiency of beam shaping (for example, large LC thickness values L usually increase the value of $\delta\phi$, but too large of a thickness L combined with too small of a gap g between electrodes will not generate strong modulation depth. On the other hand, too large of a gap g for a small of a thickness L also will reduce the modulation efficiency). That is why an optimized choice of the ratio r is desired for each application. Once the right value of r is found, multiple such segments may be combined to "fill" the clear aperture of larger beam shaping devices. Finally, given the strong anisotropic character of LCs, the propagation of light in LCs is often accompanied by dramatic transformations of light polarization. This is the reason why it is very important to understand those transformations and to design carefully the electro optic cell (electrodes, gaps, thicknesses of the cell, etc.) to obtain the desired beam shaping. One application of such beam shaping devices is for lighting in which the light from a light source, such as a beam from an LED light source, can be modulated from a spot beam to a slit or fan beam and/or to a broad flood beam.

SUMMARY

Applicant has discovered a number of characteristics related to the optical performance of beam shaping LC devices.

In some embodiments, there is provided an LC beam broadening device comprising a first LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate; and a second LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate.

In some of these embodiments, the electrodes between the first sandwich and the second sandwich are arranged to be rotated or twisted by between about 2 degrees to about 6 degrees from each other. This has been found to reduce significantly the fluctuations in the spatial intensity distribution of transmitted (thought the beam shaping device) light, including high intensity spots and lines.

In some of these embodiments, the number of LC sandwiches is three or more. It has been shown that four sandwiches in which the electrode orientation between two of the sandwiches and the other two sandwiches is at 45 degrees works well to provide good beam broadening, while reducing the spatial fluctuations of transmitted light intensity, including high intensity spots and lines.

The electrode pattern can be variable, segmented and oriented differently over the aperture and not only a single parallel linear pattern.

BRIEF DESCRIPTION OF THE DRAWINGS

The embodiments will be better understood by way of the following detailed description with reference to the appended drawings, in which:

in FIG. 4A all electrodes receive a drive signal having 5V in the same phase whereas in FIG. 4B all electrodes receive corresponding drive signals having 5V but their phases are changing to 0, 180, 90, 270 degrees respectively, in accordance with an embodiment of the proposed solution;

FIG. 5 illustrates a 3D schematic view of one beam control device element while FIG. 6 shows across sectional view of 3 adjacent elements arranged in accordance with an embodiment of the proposed solution;

Figure 1:
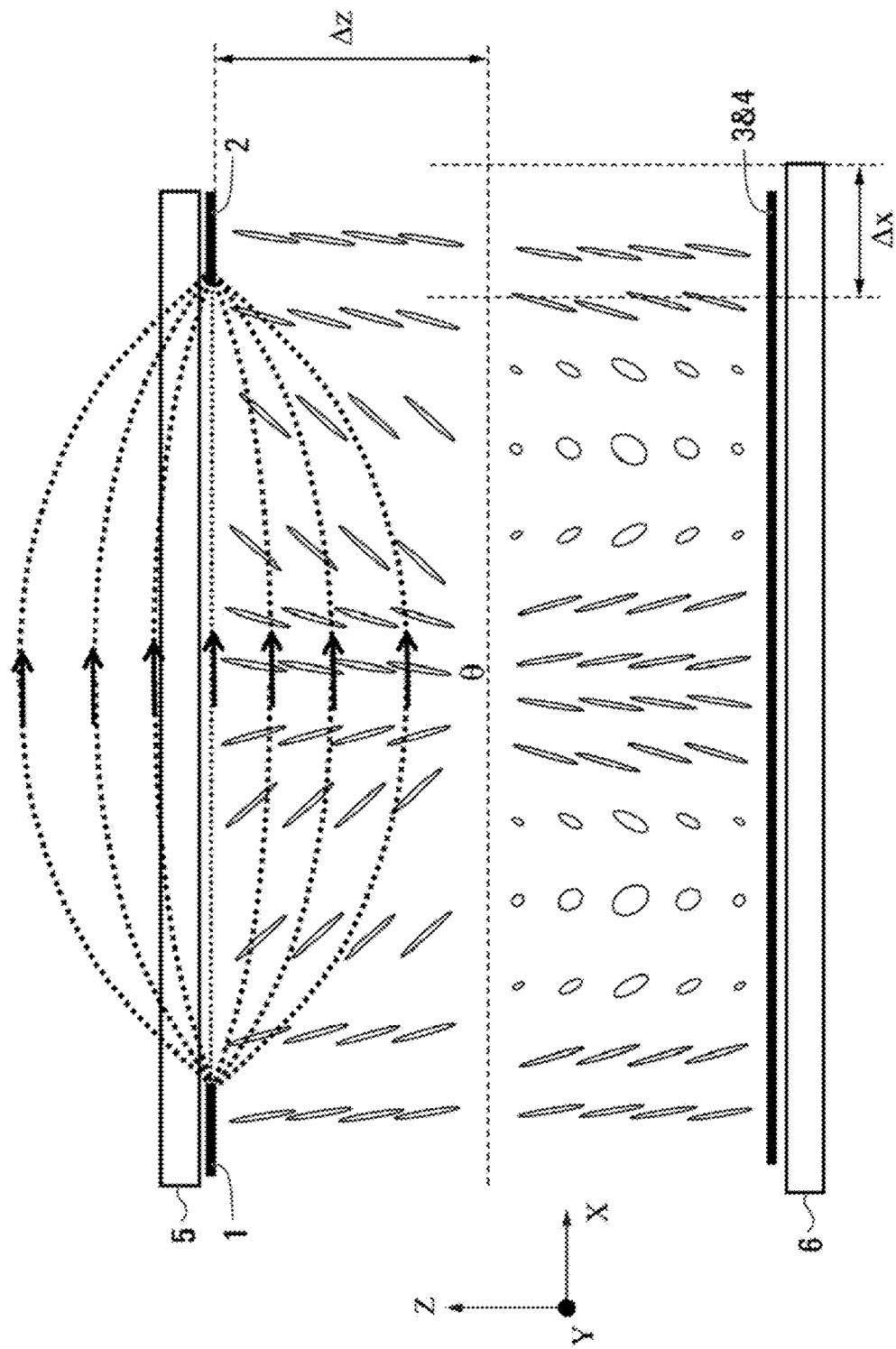
FIG. 1 is a schematic (qualitative) illustration of an operation mode that enables broadening and polarization transformation (mainly rotation) when both electrode layers (on opposed front and back first substrates) are activated in accordance with an embodiment of the proposed solution.

While the layer sequence described is of significance, reference to "top", "bottom", "front" and "rear" qualifiers in the present specification is made solely with reference to the orientation of the drawings as presented in the application and do not imply any absolute spatial orientation.

DETAILED DESCRIPTION

The beam control devices described here are optical devices which control the output beam of light either with respect to the beam divergence or with respect to the beam propagation direction (steering). Controlled beam divergence/convergence is a special case of beam control providing beam focusing/defocusing. Beam direction control can be employed for beam steering purposes. Beam control devices which provide a combination of beam diffusion, beam divergence/convergence or beam direction control are generally referred to herein as beam shaping devices.

In LC beam control devices, an electric field is typically used to control a molecular orientation of LC material in a LC cell. The electric field can be modulated in time and spatially over the aperture of a LC optical device to spatially modulate the local orientation of LC molecules. The change in molecular orientation affects the local index of refraction of the LC material and can create a refractive index gradient in the LC material throughout the LC cell volume. In a particular case, particular refractive index gradient variations can create what is known as gradient index (GRIN) focusing or defocusing lensing. For imaging lenses, it can be desirable to have a (controlled) smooth variation of LC molecular orientation over the aperture, without using numerous lens elements to form a lens of an extended aperture.

When the aperture of the beam control device is large, beam broadening and steering at large angles is difficult with a LC GRIN device due to relatively small variations in the index of refraction typically provided over the single aperture. By using a number of beam control elements having small active apertures over an effective larger aperture, smaller optical elements with a smaller aspect ratio (form factor) can provide greater overall beam broadening and steering ability. In the case of beam shaping devices, the use of a number of elements can be desirable and the profile of the electric field over the small aperture area of each beam shaping element and its interaction with the adjacent (shared) LC layer can be different from that of larger aperture devices. In some implementations of the proposed solution, employing an appropriate form factor beam device elements can provide improved beam shaping, for example beam broadening.

In some beam control devices, the controlling electric field is provided using electrodes arranged on opposed sides of the LC layer, and in others, the electric field is provided by electrodes arranged on a single one substrate adjacent (containing/sandwiching) the LC layer.

Nematic LC (NLC), when oriented in a ground state using a rubbed alignment layer (for in plane alignment), can mainly affect only one polarization component of incident unpolarized light. To modulate unpolarized light, two layers of LC, with orthogonally oriented molecular orientation, are commonly used. Natural or unpolarized light may be split (represented) into two orthogonal polarizations, only one of the polarizations will be modulated by the first LC layer (in accordance with its LC spatial modulation), while the other polarization component will essentially be unmodulated by that LC layer. The second LC layer arranged to provide the desired complementary modulation on the polarization unmodulated by the first LC layer, lets the polarization modulated by the first LC layer pass through with little or negligible modulation.

Applicant has discovered a phenomenon of dynamic (electric field induced) polarization rotation that helps creating a simple (single cell) LC device that can broaden light in two perpendicular planes.

FIG. 1 describes very schematically the cross section of an LC cell (sandwich) of an idealized geometry where both pairs of parallel electrodes (1 and 2 on top substrate 5 and 3 and 4 on bottom substrate 6) are activated simultaneously with a relative phase shift of 180 degrees. Instead of simultaneous activation of the two electrode arrangements, it is possible to alternate or time multiplex between activation of the upper and lower electrode pair arrangements.

It is important to mention that the molecular orientation pattern is illustrated in FIG. 1 only to demonstrate qualitatively the concept of light broadening with polarization rotation and transformation. In no way this is a limiting description. In this geometry, the molecular orientations that are immediately close to the internal surfaces of both substrates 5 and 6 will remain in the ground state (homeotropic) when strong anchoring conditions are present (not described here). The homeotropic alignment will remain the same also in the immediate vicinity (below) of each electrode 1, 2, 3 and 4 since the horizontal (or parallel to the substrates) components of electric fields are negligible in those areas (see extreme left and right columns of LC molecules). The situation may be similar in the center of the LC cell at least for low to moderate strength electric fields. However, the homeotropic alignment will be greatly perturbed in other zones. Namely, the main (not all) reorientation of molecules in the upper zone (delimited by the horizontal dashed line at $\Delta z$, between electrodes 1 and 2) will be mainly in the plane of drawing (x-z) since the "closest" electrode pair 1 and 2 is parallel to the y axis. In contrast, the main (not all) reorientation of LC molecules in the lower zone (between electrodes 3 and 4) will be mainly in the y-z plane that is perpendicular to the plane of drawing since the "closest" electrode pair 3 and 4 is parallel to the x axis.

However, of particular interest is the zone surrounding the area denoted by the letter θ that is between the above-mentioned zones (in the center of the cell). In fact, rotational orientation transition zones are expected around this area since the orientation of LC goes from the plane x-z to the plane y-z. The physics of twisted LC cells was intensively studied in the literature for LC displays (see, e.g., C. H. Gooch and H. A. Tarry, "The Optical Properties of Twisted Nematic Liquid Crystal Structures with Twist Angles≤90", J. Phys. D; Appl. Phys., Vol. 8, 1975). It was already established that if the twisting period P and the effective anisotropy $\Delta n_{eff}$ are large enough then the input light polarization may be rotated with the twist of LC molecules as the light beam propagates through the LC material. This phenomenon defines a new fundamental mode of operation (cross-plane broadening thanks to the polarization rotation) of the element described hereafter.

In accordance with embodiments of the proposed solution, devices described herein are configured to operate with (drastically) different operation principles (physical mechanism) to provide simplifications in the construction of practical devices. Namely, with reference to FIG. 1 an incident light beam of arbitrary (including chaotic) polarization enters the LC cell from above (from the side of the top substrate 5, propagating in −z direction) traversing the device towards the bottom substrate 6). The incident beam polarization may be presented as a sum of two linear polarization components Ex and Ey (parallel to x and y axes, respectively). The electrode strips 1 and 2 are parallel to the y axis, while the electrode strips 3 and 4 are parallel to the x axis. If electrodes 1 and 2 are activated with different electric potentials, then the activation will create (in "upper" layers) a molecular reorientation mainly in the plane x-z (schematically shown in the upper part of the FIG. 1, denoted by Δz). The input linear polarization component Ex (in this case, the extraordinary polarization) will then be broadened in the x-z plane due to the "upper" layers (slices) of the non-uniformly reoriented LC molecules. However, in addition, this polarization component will be rotated (as well as partially changing its polarization state) along its further propagation towards the bottom substrate 6 if the electrodes 3 and 4 are also simultaneously activated with further different potentials. In fact, in this configuration, the lower part of the LC cell by-and-large has more or less similar reorientation of LC molecules in the upper part of the cell (as in the zone Δz) but in the perpendicular plane. However, the two zones (upper and lower areas of LC molecular orientations) being more or less in perpendicular planes) the central zone (at the level of the letter θ in FIG. 1) represents a transition zone with molecular twist. If the parameters of the LC cell, its reorientation and the wavelength range of light are appropriately chosen, then the linear polarization component Ex will arrive at substrate 6 with rotated and transformed polarization mainly being parallel to the y axis.

Due to this polarization rotation and transformation, the same polarization component Ex will reach the area affected by electrodes 3 and 4 as mainly a polarization that is perpendicular to the electrode lines 3 and 4. Thus, it will be also broadened in the plane y-z.

At the same time, the input polarization component Ey will mainly remain "unaffected". It will enter into the LC cell as mainly "ordinary" type of polarization and will also undergo polarization rotation (with some partial change of the degree of polarization also) to reach electrode strips 3 and 4 still as "ordinary" polarization. Thus, the LC cell will not affect noticeably the input polarization that was originally parallel to the y axis.

Thus, the simultaneous activation and phase shift between electrodes enable employing a single LC cell to broaden a given linear polarization component of light in two (azimuthal) planes. This type of the LC cell enables the construction of a full-polarization operational device (broadening unpolarised light in two azimuthal planes) by just adding another similar (as described herein with reference to FIG. 1) LC cell (element) to the first LC cell. In addition, this may be achieved without using any polarization rotation element (since the LC itself is used to dynamically rotate the light polarization). Indeed, the addition of a second similar LC cell (the "entrance/input side" electrode pairs of the second LC cell being crossed with respect to the "exit/output side" electrode pairs of the first LC cell) and the progression of main polarization and broadening states are schematically presented in the FIG. 2A which describes schematically an idealized geometry where both pairs of electrodes (1 and 2 on top substrate 5 and 3 and 4 on bottom substrate 6) are activated with relative phase shift of 180 degrees. Thus, the E1 and E2 are input polarizations (parallel to y and x axis, respectively). The input pair of electrodes 1 and 2 (at the entrance substrate) is parallel with x axis. Thus, according to the mechanism, described above, the E1 component will be broadened in the y-z plane by the entrance slices of the first LC cell. The E2 component will not be affected. Both components will propagate along the z axis towards the exit slices of the first LC cell. There will be a 90 degree rotation of those two polarization components during that propagation. Thus, the "original E1 component will reach the exit slice of the first cell being perpendicular to the pair of electrodes 3 and 4 (on the exit substrate). It will be broadened in the x-z plane when exiting the first cell. The original E2 component will reach the reach the exit slice of the first cell being parallel to the pair of electrodes 3 and 4 (on the exit substrate). It will not be noticeably affected after the exit from the first cell. A similar process will happen during the propagation in the second LC cell, but, this time, the "original" E2 component will be broadened in two (x-z and y-z) planes.

Figure 2A:
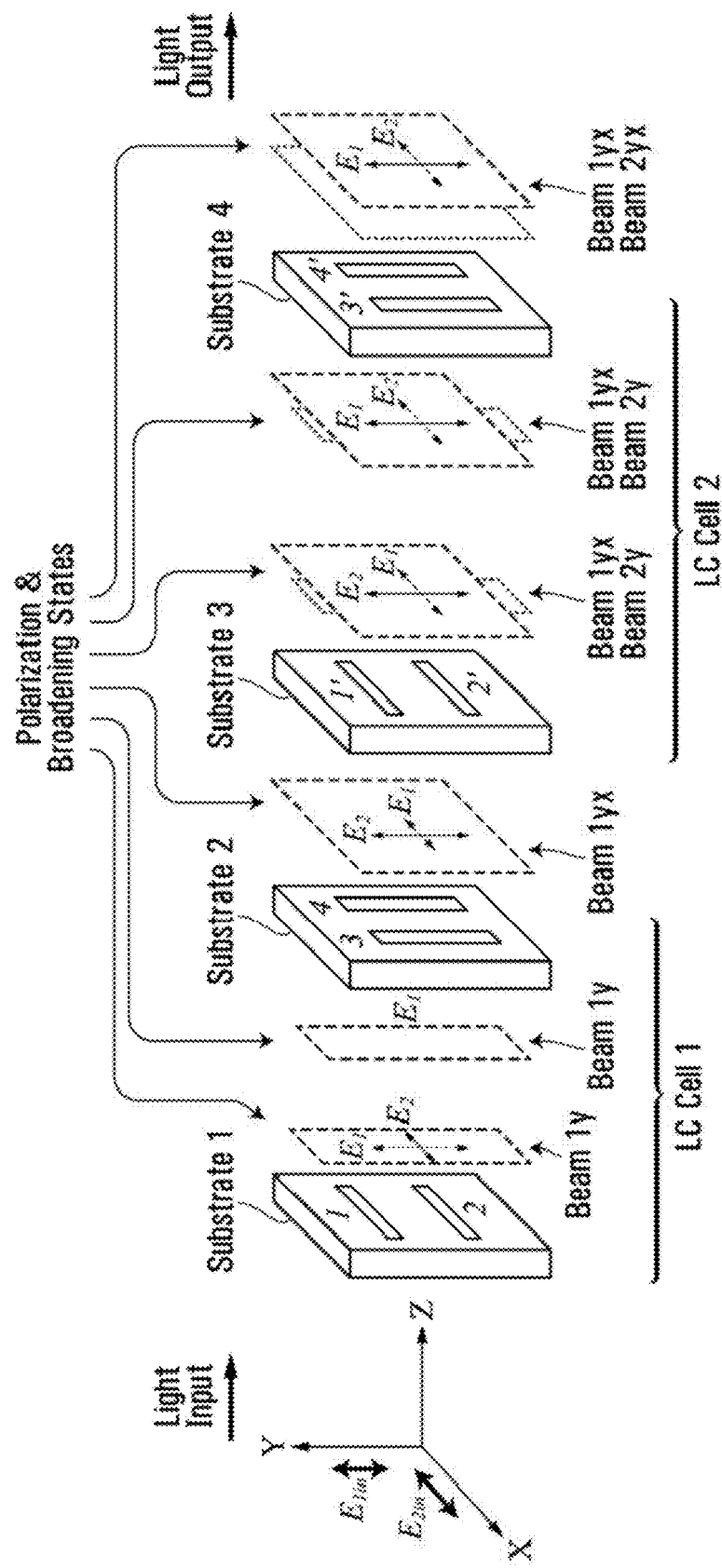
FIG. 2A is a schematic illustration of the evolution of broadening and polarization transformation of a light beam propagating in a device with two LC sandwiches (for broadening unpolarised light in two azimuthal planes) based on the discovered operation mode herein, in accordance with an embodiment of the proposed solution.
Figure 2B:
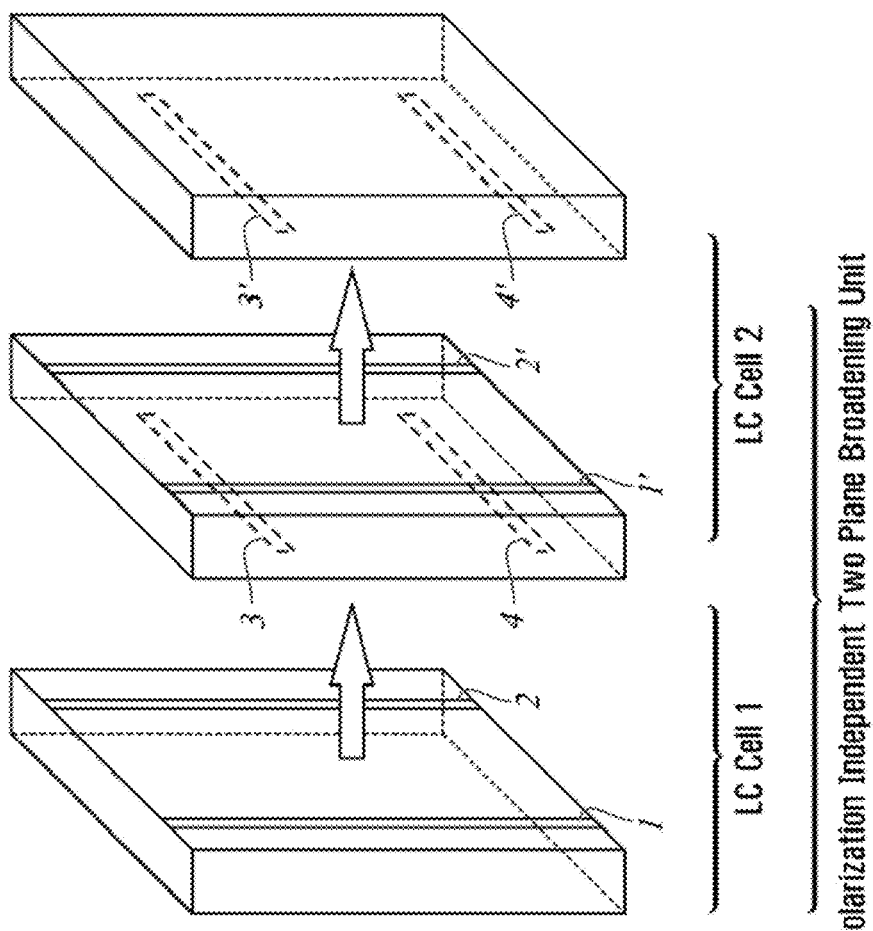
FIG. 2B is a schematic illustration of a cost effective final device (for broadening unpolarised light in two azimuthal planes) based on the discovered operation mode herein, in accordance with an embodiment of the proposed solution.
Figure 2B:
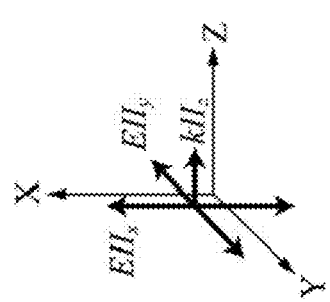
Figure 2C:
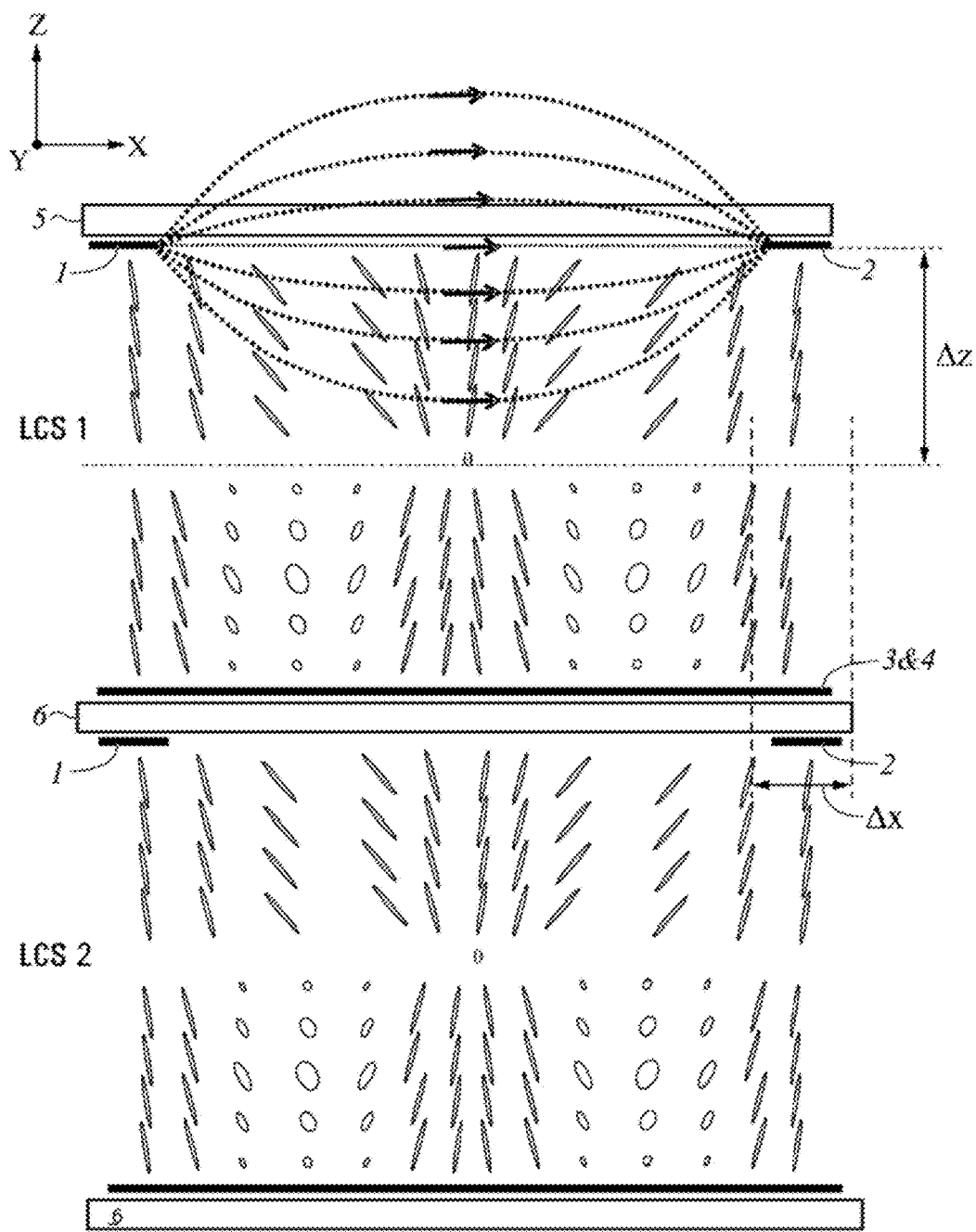
FIG. 2C is a schematic cross-sectional view of two LC sandwiches in which each sandwich has a homeotropic ground state LC alignment with the internal electrodes of the opposed cell substrates that are orthogonally arranged.

FIG. 2B shows schematically the combination of two cells using only three substrates (one common) that can reduce the thickness and the cost of the combined device, and FIG. 2C shows schematically the cross section of the corresponding (to FIG. 2B) combination of two such cells in a manner similar to FIG. 1.

The fact that there is no need for a polarization rotation element and no need for rubbing of the alignment layers (simple homeotropic or vertical alignment may be used here) simplifies greatly the manufacturing of such a beam control device which enables employing only three substrates and only four electrode layers, as shown in the example in FIG. 2B illustrating a low-cost polarization insensitive element for light beam broadening in two azimuthal planes thanks to the electric field induced internal polarization rotation.

Figure 3A:
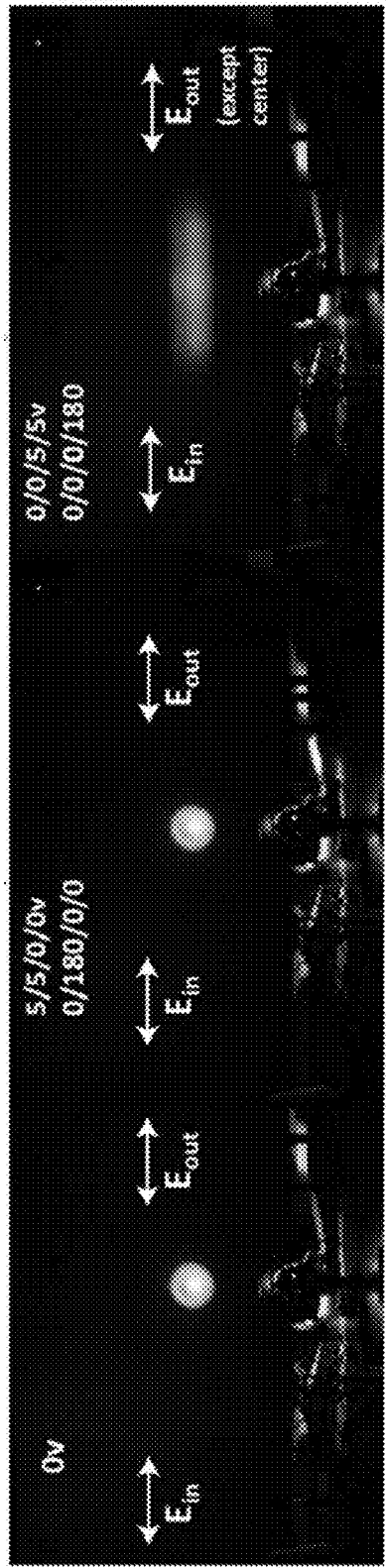
FIG. 3A illustrates an experimental demonstration of beam broadening and polarization transformation of that beam when only one (horizontal) of the polarization components of input light is present and only one (first horizontal then vertical) electrode layers is activated in accordance with an embodiment of the proposed solution.
Figure 3B:
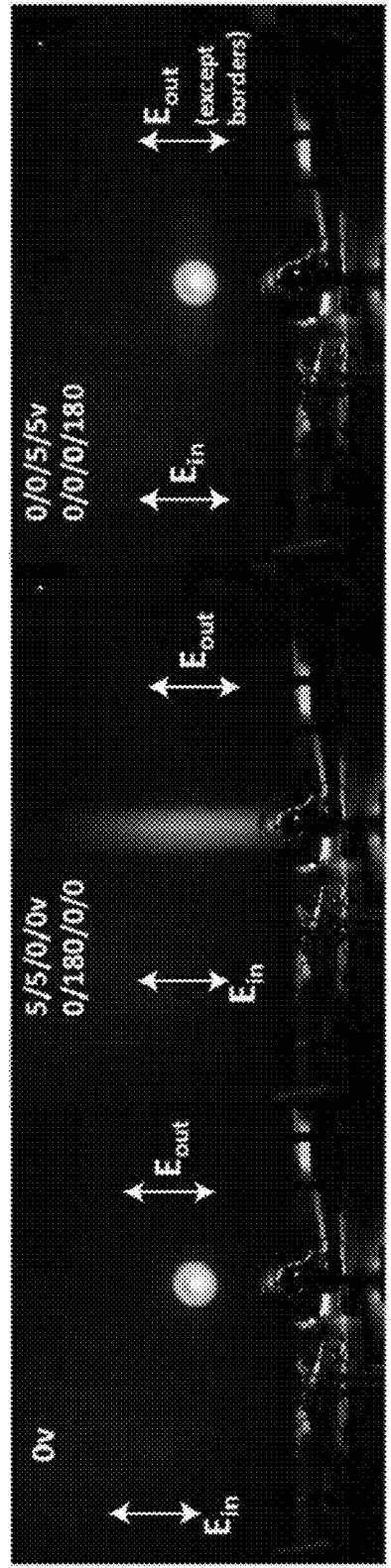
FIG. 3B illustrates an experimental demonstration of beam broadening and polarization transformation of that beam when only one (vertical) of the polarization components of input light is present and only one (first horizontal then vertical) electrode layers is activated in accordance with an embodiment of the proposed solution.
Figure 3C:
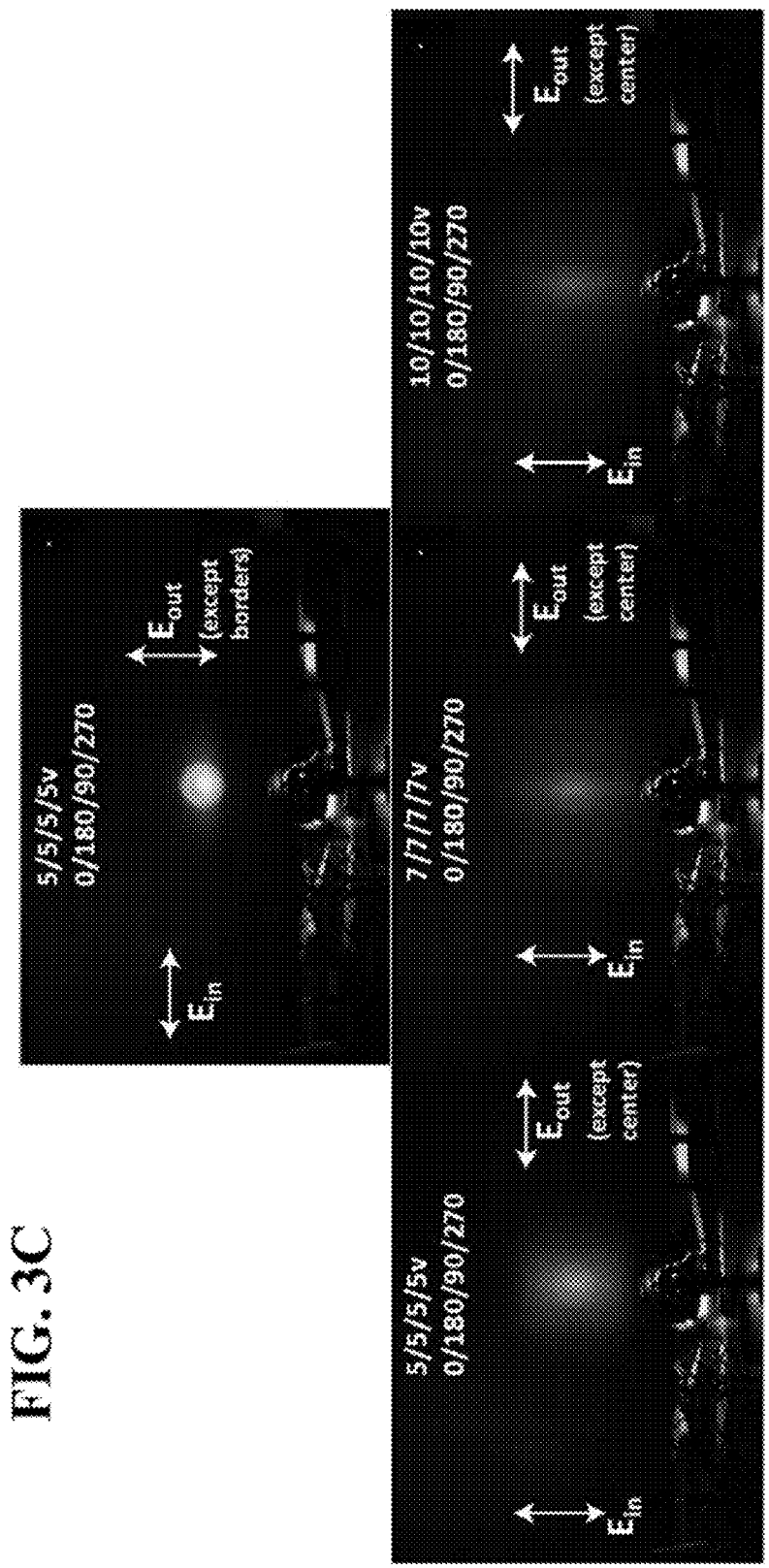
FIG. 3C illustrates an experimental demonstration of beam broadening and polarization transformation of that beam when both of the electrode layers are activated, in accordance with an embodiment of the proposed solution.

The corresponding experimental confirmation is demonstrated with success in FIG. 3A, FIG. 3B and FIG. 3C. Indeed, in the example illustrated here, the pair of electrodes on the entrance substrate is "horizontal", while the pair of electrodes at the exit substrate are "vertical". FIG. 3A shows the case of incident light with linear polarization that is "horizontal" (parallel to entrance pair of electrodes). FIG. 3B shows the case of incident light with linear polarization that is "vertical" (parallel to exit pair of electrodes). The left figures show the beam when the cell is in the ground state (no activation). The middle photos show the case when only the first pair of electrodes is activated (with different electric potentials). The right-side pictures show the case when only the exit pair of electrodes is activated (with different electric potentials).

Applicant's experiments confirm that there is no polarization rotation when only one pair of electrodes is activated within the single LC cell (either 1 and 2 in FIG. 3A or 3 and 4 in FIG. 3B). There is no broadening of light in the ground state of the LC cell (left pictures in FIG. 3A and FIG. 3B) as well as in the case when one pair of electrodes is activated, but the input light polarization is parallel to those activated electrodes (middle picture in FIG. 3A and right picture in FIG. 3B). In contrast, there is broadening of light only in one plane (and still without polarization rotation) when the activated pair of electrodes and the input light polarization are perpendicular (right picture in FIG. 3A and central picture in the FIG. 3B). Thus, the light broadening is obtained only in the plane that is perpendicular to activated electrode pair.

FIG. 3C illustrates our experimental results when both pairs of electrodes (1 and 2 as well as 3 and 4) are activated with different potentials and phases. When both finger-like electrode pairs on corresponding substrates are simultaneously driven: 90° rotation of light polarization is observed, all-direction (two azimuthal plane) broadening for one polarized component (with the second polarization component remaining largely unchanged), and providing good rectangular pattern of a broadened light beam (projection). Thus, the top central picture demonstrates the case when the incident light has "horizontal" polarization (the LC cell is the same as before, with entrance electrode pairs being "horizontal"). In this case, essentially a 90 degrees rotation (accompanied with slight changes of the degree of polarization) is observed without a noticeable broadening on that light. The vertical double arrow illustrates the orientation of the analyzer, allowing the passage of only "vertical polarization component of light.

The bottom left picture of FIG. 3C illustrates the fact that the input light with "vertical" polarization is broadened and there is also essentially a 90 degrees rotation of its polarization at the exit of the LC cell. This broadening is more pronounced for higher voltages (middle and right pictures of FIG. 3C).

Figure 4B:
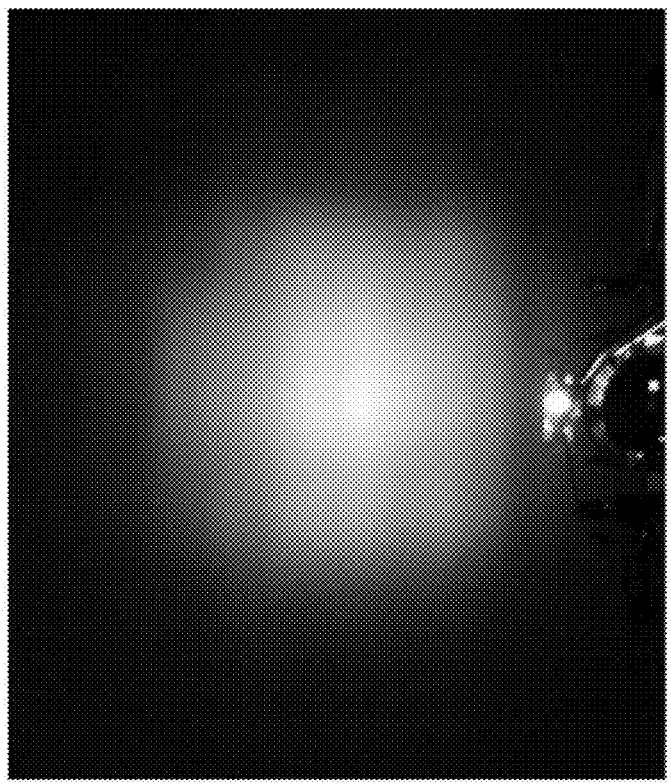
FIGS. 4A and 4B illustrate via experimental demonstrations the importance of having independent electrodes and applying the selected phase delays to obtain acceptable light broadening.
Figure 4A:
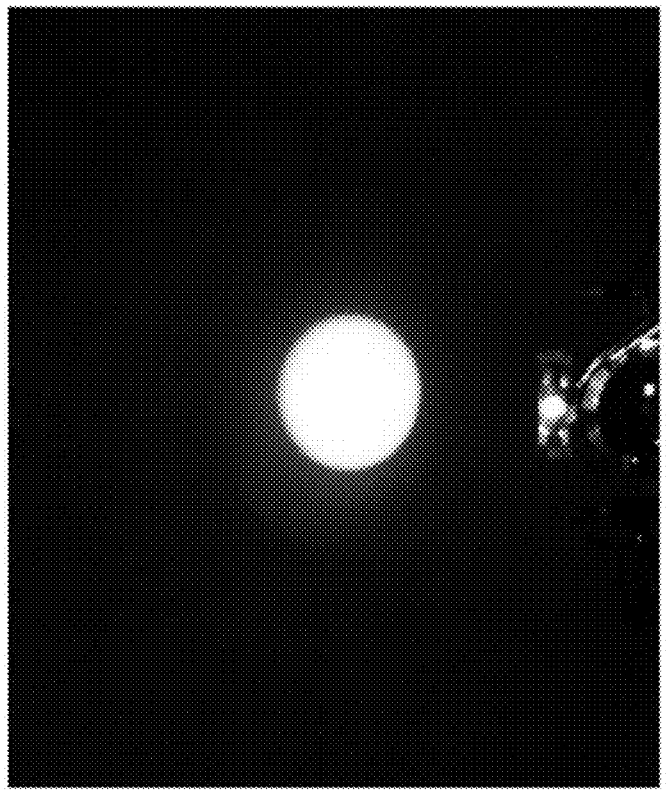
Figure 5:
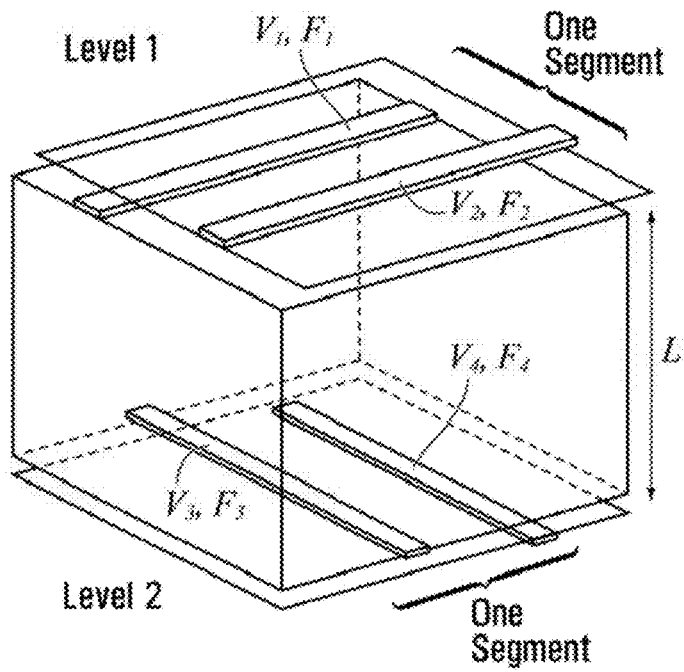
FIGS. 5 and 6 are schematic illustrations of double layered electrode configuration wherein "pairs" of independently controlled electrodes are fabricated at different levels (separated by thin isolation layers)
Figure 6:
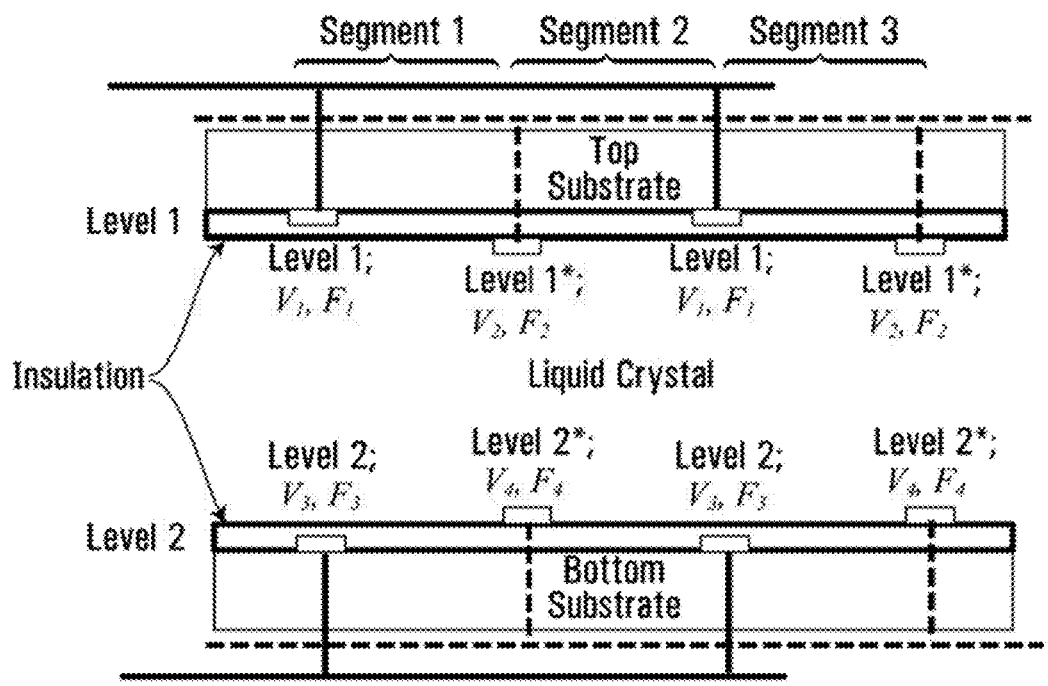

FIGS. 4A and 4B illustrate experimental demonstration of the importance of having independent electrodes and applying thereto corresponding drive signal components having (appropriate) selected phase delays therebetween to obtain useful acceptable light beam broadening. In FIG. 4A all electrodes are driven at 5V in phase, while in FIG. 4B all electrodes are driven with 5V drive signals however the signal phases are provided with 0, 180, 90 and 270 degree delays. Alternative driving approaches may also be used such as 0, 180, 90, 270 or 0, 180, 0, 180 degrees In another embodiment of the proposed solution, similar performance may be achieved by using two layers of electrodes (separated by a thin insulating layer) to build independently controllable electrode pairs for example as schematically illustrated in FIG. 5 and FIG. 6. Insulation of the electrodes prevents shorts (during the manufacturing), reduces the current flowing between electrodes (reducing thus the power consumption) and allows various electrode configurations on the same substrate to increase the functionality of the cell.

In another embodiment of the proposed solution, two LC cells will be spatially shifted with respect to each other and preferably in the diagonal direction (with respect to electrode lines). Such a configuration avoids the coincidence of zones where the reorientation of molecules is not appropriate (such as disclination regions). For example, employing homeotropic alignment (FIG. 1), LC molecules tend to remain homeotropic just under (adjacent to) the electrodes. If such disclination regions register (are the same for both) between LC cells, then the light passing through such disclination zones will not follow the same mechanism of modulation.

In another embodiment of the proposed solution, a small (separation) distance may be considered between the two unit LC cells which can improve the light intensity distribution.

Figure 7A:
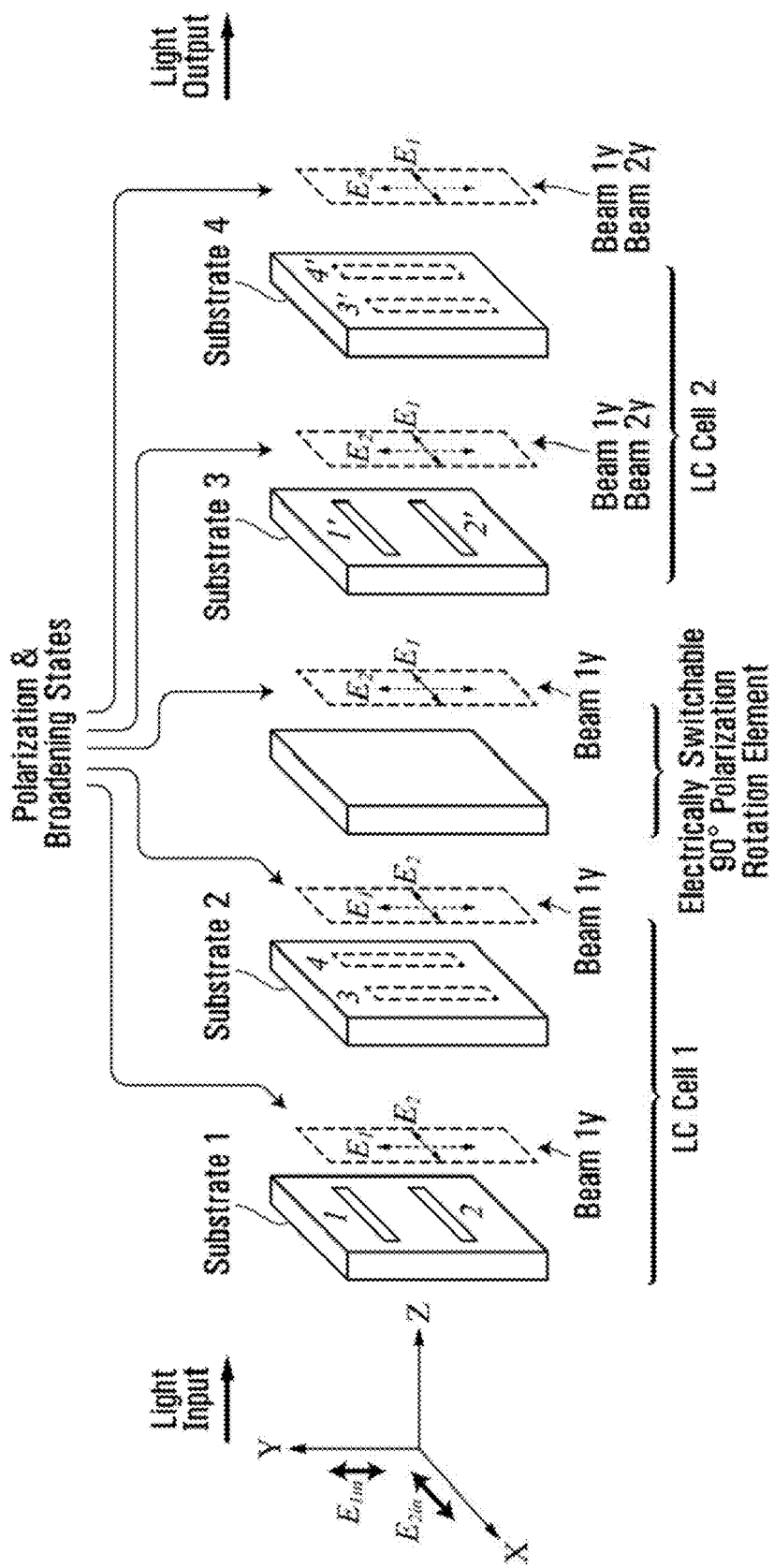
FIGS. 7A, 7B and 7C are schematic illustrations of a universal beam control device capable of broadening an unpolarized input light beam in one desired (azimuthal) plane only, e.g., azimuthal YZ, FIG. 7A or in the plane perpendicular to the azimuthal plane, and double broadening of the desired polarization component of light letting the perpendicular component remain unaffected (FIG. 7B) and the polarization rotation (between cells) are activated in accordance with an embodiment of the proposed solution (the polarization rotation must be removed to go back to the symmetric broadening mode), or symmetrically broadening unpolarized light in two perpendicular planes (FIG. 7C)
Figure 7B:
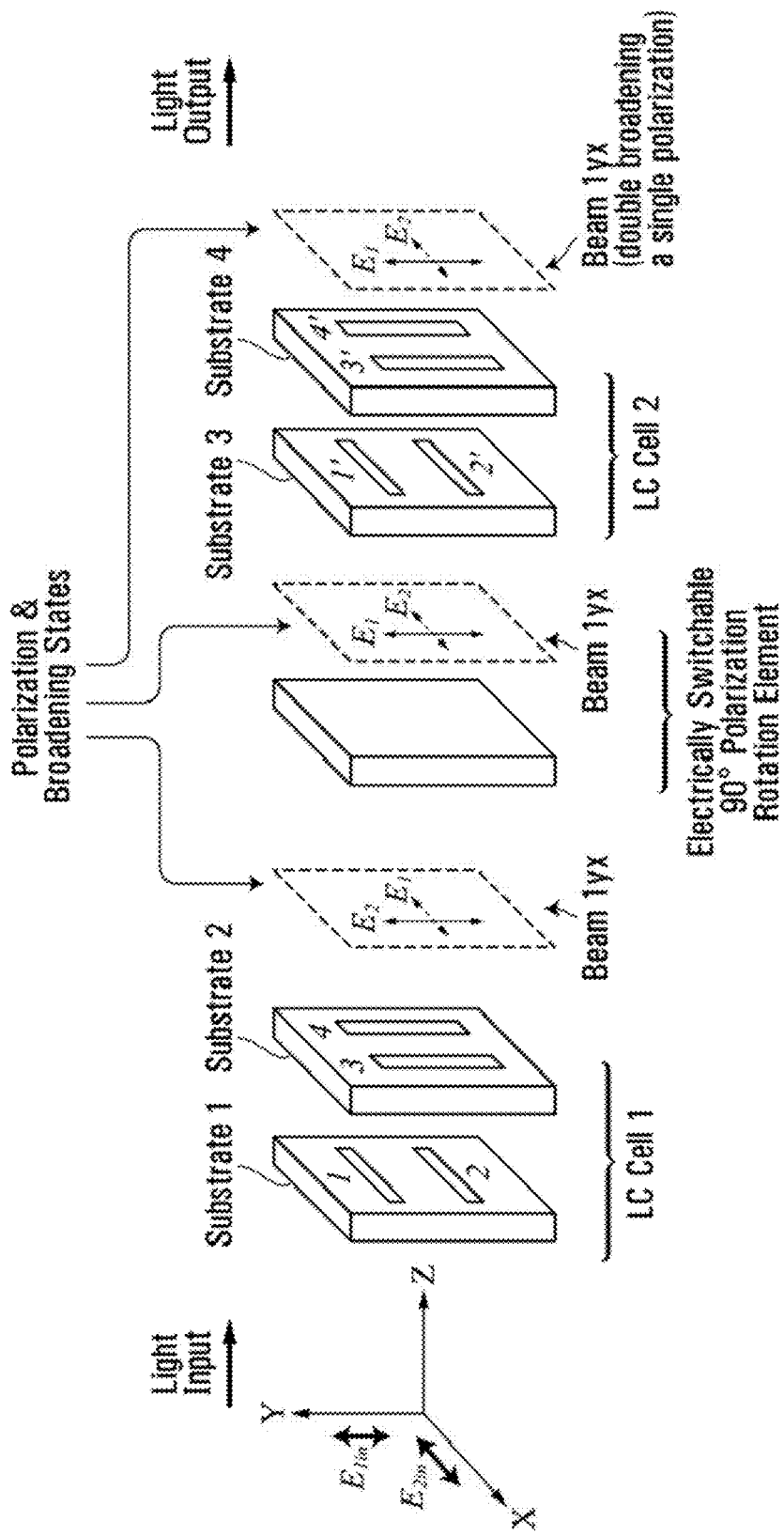
Figure 7C:
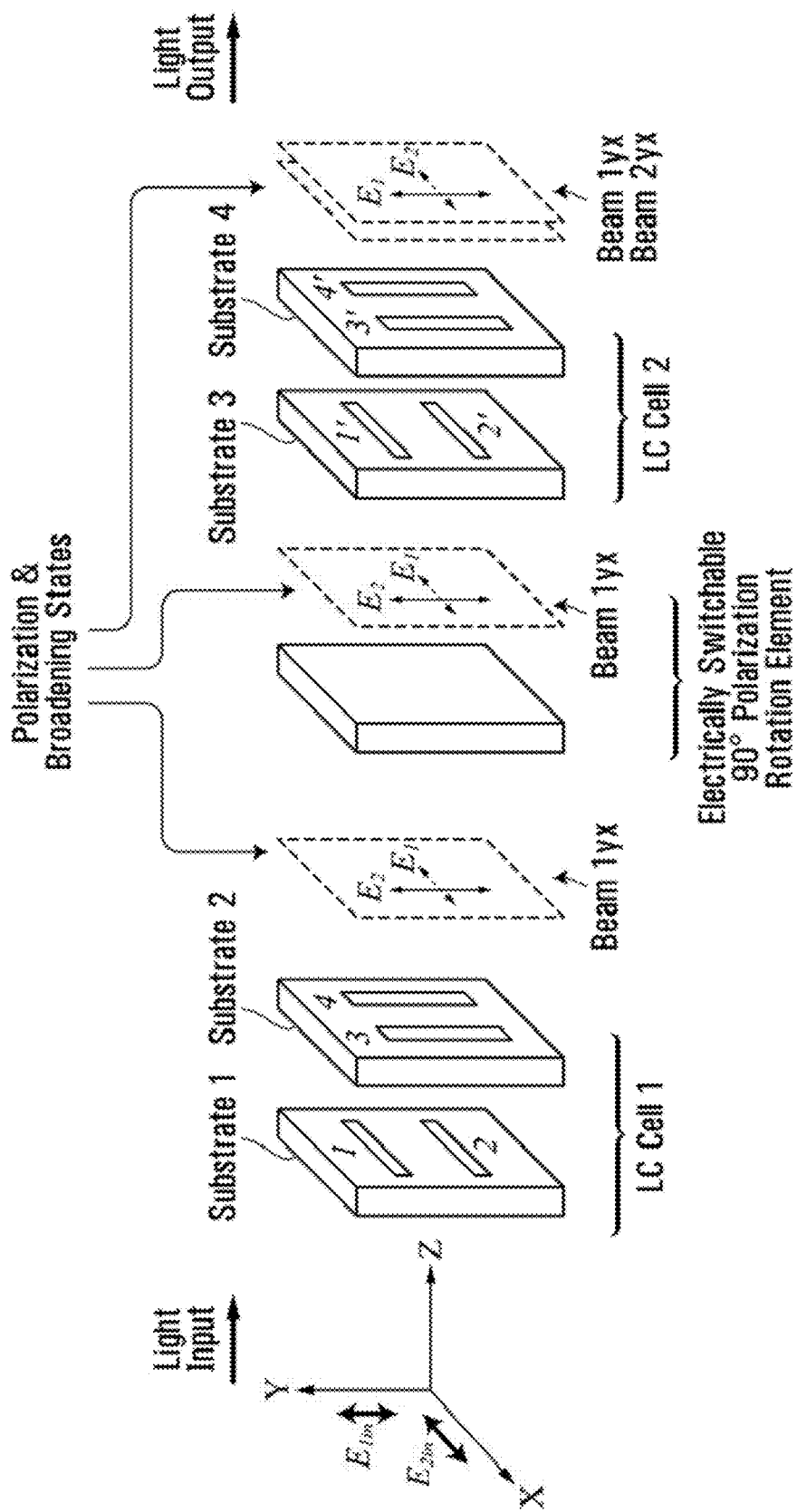

In another embodiment of the proposed solution, an electrically variable (switchable) polarization rotation element can be employed (such as a standard twisted LC cell) between two unit LC cells to enhance the device operational capabilities. FIG. 7 schematically demonstrates such a beam control device which is capable of broadening unpolarised light in one desired (azimuthal) plane only (or in the perpendicular azimuthal plane) and/or double broadening of the desired polarization component of light while the other (perpendicular) component remains substantially unaffected. Thus, if the electrically switchable 90 degree polarization rotation element (in the middle of FIG. 7A) is in its "rotation mode", then the first LC cell may broaden the "vertical" input polarization component of light ($E_{1in}$), for example, in the plane y-z if only the first pair of electrodes (1 and 2) is activated as shown. As it was demonstrated above, there will be no polarization rotation inside of the LC cell for this polarization component. Also, there will be no broadening nor polarization rotation for the "horizontal" polarization component of input light ($E_{2in}$). Then, both components will be rotated to 90 degrees with the help of the electrically switchable polarization rotation component and will reach the second cell; now the $E_{1in}$ being in the "horizontal" plane and the $E_{2in}$ being "vertical". If, in the second cell also, we activate only the first pair of "horizontal electrodes (1' and 2') then now only the $E_{2in}$ component will be broaden in the y-z plane while the $E_{1in}$ component will pass through without noticeable modification. Thus, we shall obtain broadening of both polarization components ($E_{1in}$ and $E_{2in}$) in one desired y-z plane. Alternatively, we can activate the electrodes 3 and 4 as well as 3' and 4' only (but not electrodes 1, 2 and 1' and 2') and obtain a similar broadening but in the x-z plane. This will allow stretching light in two perpendicular planes when desired.

Alternatively, if we activate all electrodes (with different potentials) as well as the polarization rotation element (performing 90 degrees rotation) then this device will allow very strong (double) broadening of a single polarization component in both perpendicular planes (FIG. 7B), while leaving the perpendicular polarization unchanged.

In contrast, if the electrically switchable 90 degree polarization rotation element (in the middle of FIGS. 7A to 7C) is in its "passive mode" (no rotation of polarization; for example when applying very strong electric field and all of its molecules become homeotropically aligned), then the operation of the entire assembly can be returned to the symmetric mode (FIG. 7C): simultaneous broadening of both polarization components in two perpendicular planes.

The arrangement of the electrodes described above has been only schematic and done for illustration of the LC direction of orientation. It will be appreciated that the electrode spacing can be quite small, as can the width of each electrode, while the layer of LC is likewise small, and the device can remain effective for beam broadening. For example, the gap between the electrodes can be in the range of 30 to 120 microns with a LC layer thickness of about 60 to 150 microns. While linear strip electrodes 1, 2, 3, 4 can be used to provide beam control elements that are straight; zigzag patterns, sinusoidal patterns, spirals, concentric, radial and other geometric patterns can be used.

Figure 8A:
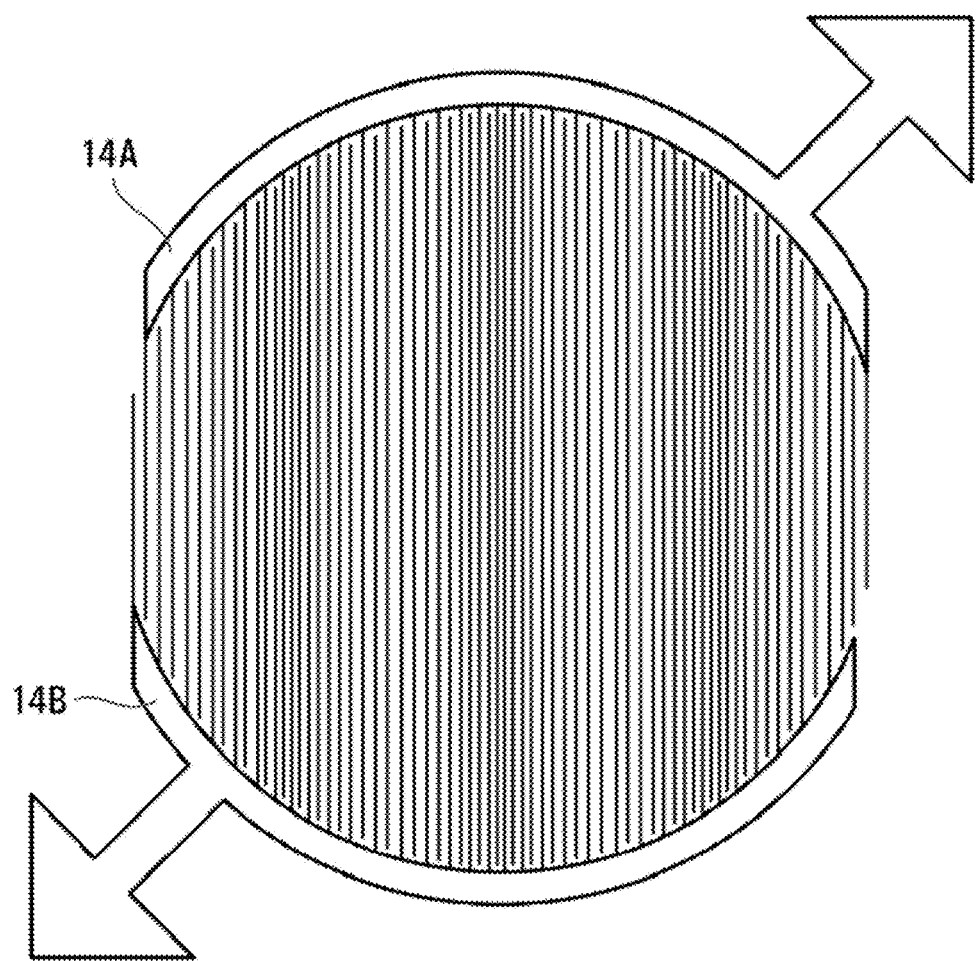
FIG. 8A is a schematic plan view diagram illustrating an array of chirped strip electrodes having a spatially variable gap or spacing between the strip electrodes in accordance with the proposed solution.

Regular spacing or a "chirping" variation in the spacing between electrodes can be used. In FIG. 8A, there is shown a circular aperture in which the parallel electrodes on each substrate extend in a uniform direction. The electrode gap is 50 microns in the middle of the 6 mm device aperture and 100 microns at the outer sides. In the example illustrated, the gap g increases (can also decreases) by 5 microns from one gap to the next. Small gaps may provide a higher beam shaping or beam steering ability or power, and larger gaps would rather provide smaller power. Such variation of electrode gap g may be linear or non-linear. An effect of the variation, or chirp, can be to eliminate or reduce color separation and formation hot spots or lines (high intensity zones) in the (transmitted) projected light beam. This is because different portions of the overall optical device will redirect the same wavelength (i.e. color) of light in different directions.

Figure 8B:
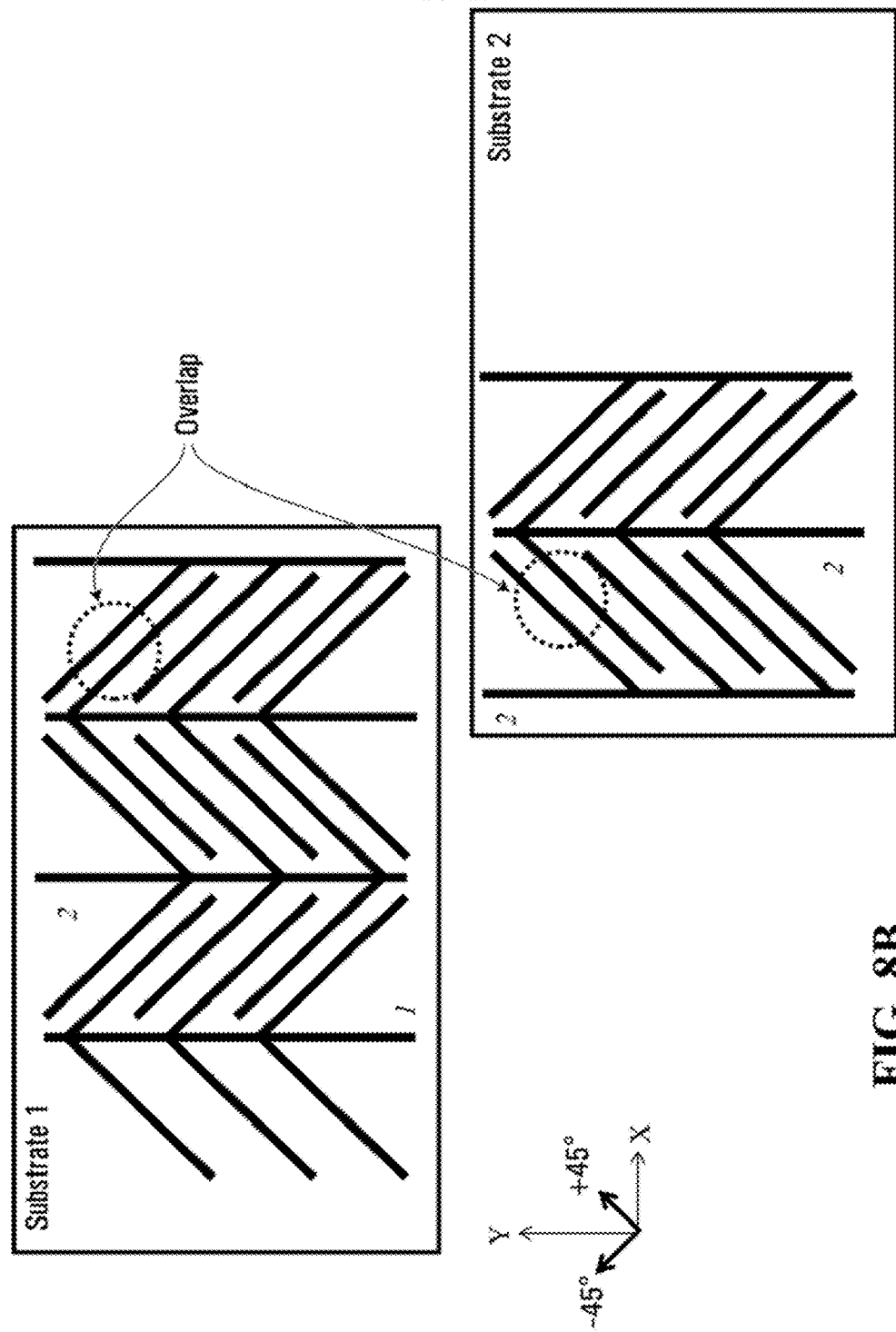
FIG. 8B is a schematic plan view of substrates of a LC cell with "excited" twisted molecular reorientation (when all electrodes on opposed substrates are activated simultaneously and independently with different phases) which may be used to broaden unpolarized (natural) light in two (azimuthal) planes in accordance with an embodiment of the proposed solution.

As it can be appreciated from FIG. 8B, the electrode pairs may be etched (or printed) in a "tree-like" manner to have interdigitated electrodes 1 and 2, which are still locally parallel while their orientation alternates on 90 degrees from zone to zone. This herringbone pattern shown creates different regions of parallel electrode orientation directions that are orthogonal to each other. It is possible to have any number of regions of different orientation direction, and the regions can be interleaved as in FIG. 8B or distinct as in FIG. 9.

The same pattern may be etched or printed on the opposed surface (on the second glass substrate), however during the cell assembly glass substrate 2 would be shifted with respect to the first glass substrate, such that the two encircled zones face each other with electrodes on the glass substrate 2 being perpendicular to electrodes of glass substrate 1 in the zone.

Applicant has discovered that the beam broadening is not symmetrical in x-z and y-z planes (directions) in the geometry of electrodes shown in FIG. 2A. This is related to the asymmetry of the geometry, namely, the broadening in y-z plane, defined by the substrate 1 (for E1 polarization) and the substrate 3 (for E2 polarization), which affects mainly the incident half of the propagation path of the light within the device, and the broadening in the x-z plane (direction), defined mainly by the substrate 2 (for E1 polarization) and the substrate 4 (for E2 polarization), which affects mainly the outgoing half of the propagation path of light within the device, do not have the same efficiency. This asymmetry can be corrected using special interdigitated electrode patterns where all (1, 2, 3 and 4) substrates participate in both x-z and y-z broadening directions equally. This can be achieved for example by designing of paired sets of interdigitated electrodes on the same substrate, each set of electrodes being orthogonal to the other one. Such a design is shown in, without limiting the invention thereto, in FIGS. 8 and 9 as described hereinbelow.

In addition, some intensity non uniformities may be observed in the transmitted light, such as high intensity spots or lines, defined by the orientation of the above mentioned electrodes.

Figure 9:
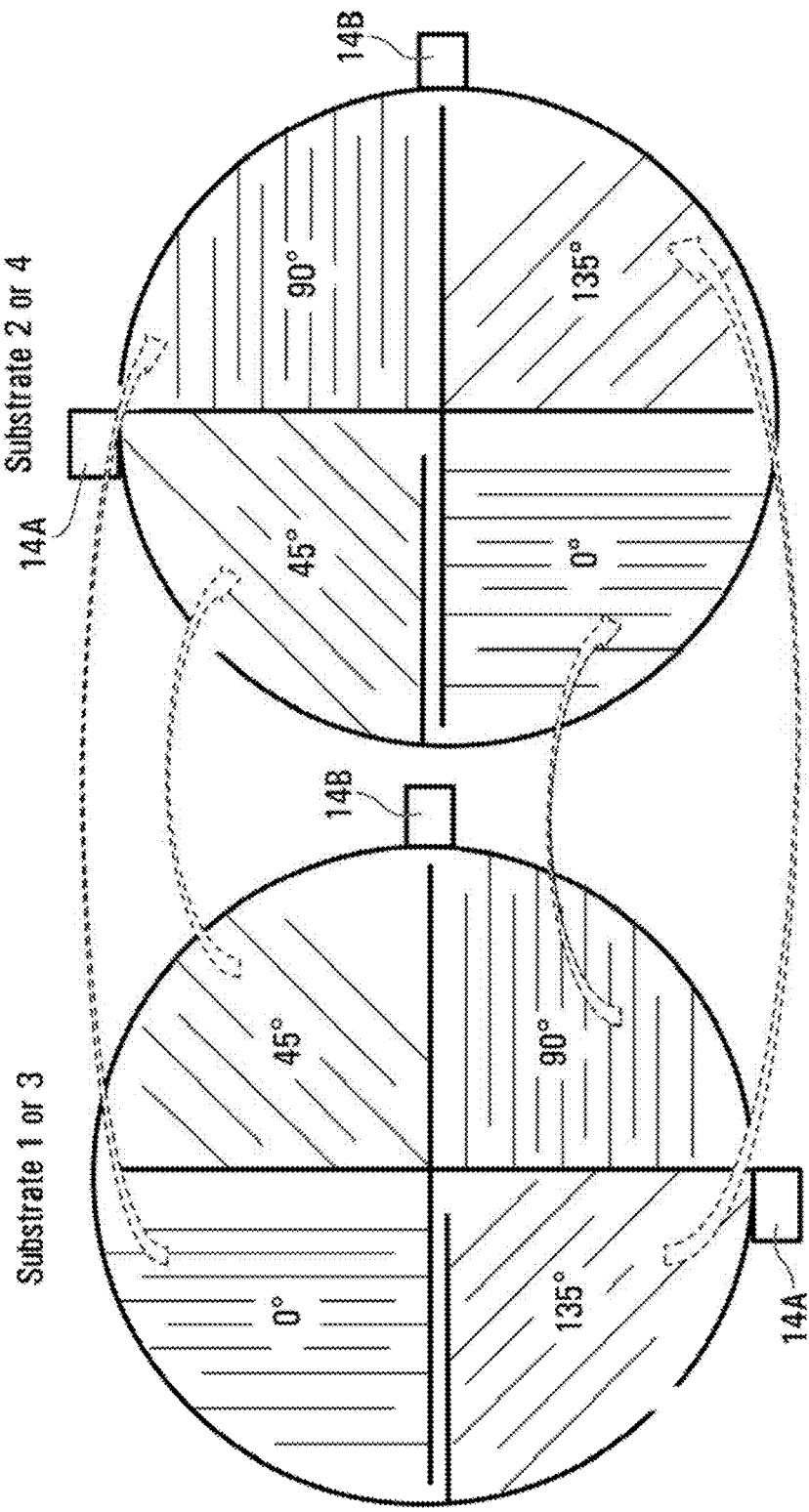
FIG. 9 is another schematic plan view of the substrates of another LC cell with multiple (here 4) segments that are "excited" to generate twisted molecular reorientation (when all electrodes on opposed substrates are activated simultaneously and independently with different phases) which may be used to broaden unpolarized (natural) light in two (azimuthal) planes in accordance with an embodiment of the proposed solution.

Applicant has discovered that we can reduce the above mentioned asymmetry and non-uniformities by using segmented electrode zones. FIG. 9 illustrates another geometry with, for example, four sets of interdigitated electrodes on each substrate in four different regions or quadrants, in which we have two pairs of electrode pairs (oriented in a total of four directions), two pairs of electrodes are made from "horizontal" and "vertical" electrodes, while two other electrodes are tilted by 45 degrees in respect to the others. It will be appreciated that a beneficial effect provided by having different regions can be achieved beginning with only two regions. The orientation of substrates is made in a way that for each position of light incidence and propagation, two cross oriented pairs of electrodes are present. However, the orientations of those electrodes are different depending upon the incidence point of light. The LC cell may be filled, for example, by a homeotropically aligned liquid crystal (without rubbing). In this configuration, locally, the encircled zone (and others by analogy) acts like in the configuration where linear interdigitated electrode pairs were pointing in a given direction on the first substrate and the same pattern, but turned at 90 degrees is employed on the second substrate. Such a single LC cell provides beam broadening of light with an input polarization that is perpendicular to the electrodes (at the first "entrance" glass substrate) in the plane perpendicular to those electrodes and the same light will be broadened in the perpendicular plane near to the exit surface (after having its polarization rotated by 90 degrees). The same concept can be used with different types of electrode arrangements. This additionally will improve the broadened light uniformity by better distributing the light intensity and by smoothening the cross like patterns observed for incident low divergence light beams.

Figure 10:
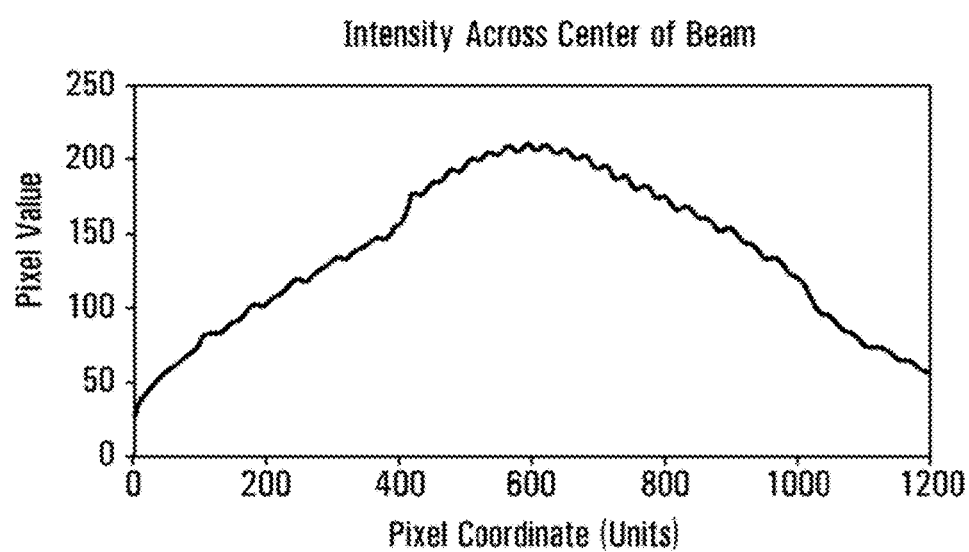
FIG. 10 is a plot of the beam intensity for a beam passing through a device according to FIG. 2 taken along a line passing through the transversal cross-section of the beam that shows a rippling (periodic spatial modulation) effect in the beam intensity.
Figure 11:
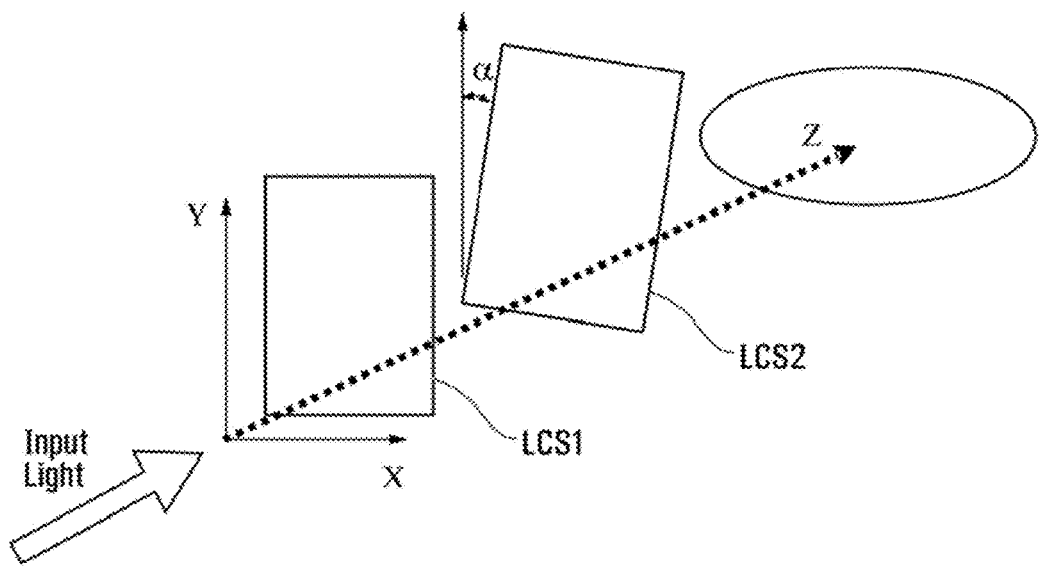
FIG. 11 is a schematic illustration of two LC sandwiches according to FIG. 2 in which a small angle rotation is provided between the LC sandwiches.
Figure 12:
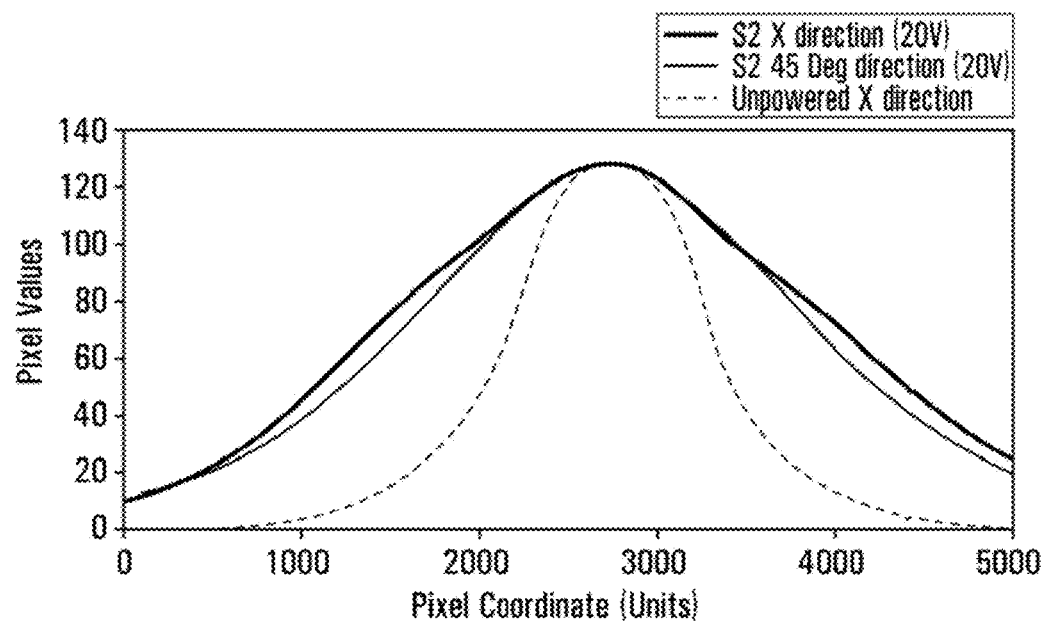
FIG. 12 shows plots of the beam intensity in ground state (unpowered) and excited states taken along horizontal and at 45 Degree lines passing through the transversal cross-section of the beam that shows how the rippling effect in the beam intensity is mitigated by the small angle rotation using the configuration of FIG. 11.
Figure 13:
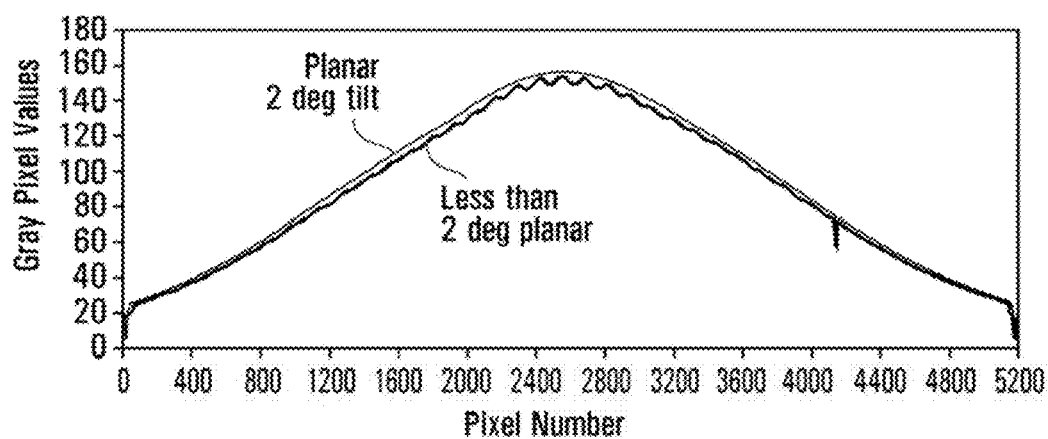
FIG. 13 is a plot of the beam intensity for a beam passing through a device according to FIG. 2 taken along a line passing through the transversal cross-section of the beam that shows a rippling effect in the beam intensity and a plot of the beam intensity for a beam passing through a modified device according to FIG. 11 in which there is a rotation of 2 degrees between LC cells 1 and LC cells 2 taken along a line passing through the transversal cross-section of the beam that shows absence of the rippling effect in the beam intensity.

As shown in FIG. 10, the beam intensity from the arrangement of FIG. 2A produces a small intensity variation (periodic spatial modulation or "ripple" of intensity). The applicant has discovered that by introducing a rotational offset between the two LC sandwiches of FIG. 2A of approximately 5 degrees, as shown in FIG. 11, it has been observed that the ripple in the intensity is greatly mitigated, as shown in FIGS. 12 and 13. As can be seen, the improvement in the beam intensity profile is significantly improved. This improvement is found to occur beginning at about 2 degrees of rotation (see FIG. 13 for the comparison between no rotation and 2 degrees of rotation), and the rotational offset is best limited to within about 8 degrees. Rotations larger than about 8 degrees can adversely affect the ability to handle both polarizations for beam broadening in both directions equally.

The rotational offset can involve a physical rotation of the same electrode pattern on each of the two sandwiches, or it can be a selection of patterns that will provide the rotational offset of the large number of small beam broadening strips disposed between parallel electrodes are active in modulating the beam over the aperture between the two sandwiches or cells 1+2 and 3+4.

The device can be made as illustrated in FIG. 2B with a common substrate between the two LC sandwiches, or it can be made with separate substrates such that each sandwich can be made separately. Providing the rotational offset when the two sandwiches share the same middle substrate can involve printing the electrodes of each sandwich to have the desired rotational offset.

One example of the latter is to arrange the finger electrodes of a rectangular substrate to be at, for example, 88 degrees from the edge of the substrate with the finger electrodes of the adjacent sandwich having, for example, 92 degrees from the edge of the substrate, such that there would be a 4 degree rotational offset between the two sandwiches. When the desired device has a circular aperture, the whole electrode arrangement can be rotated in one or both sandwiches or cell groups, and the combined sandwiches will have the desired rotational offset.

This can be useful when multiple beam broadening devices are made from a larger substrate as a wafer and then singulated into individual single or double sandwiches.

When two identical single sandwich singulated LC devices having rectangular shapes and electrode fingers orthogonal to the sides are used together, the small rotational offset can be provided during a step of bonding the LC sandwich devices together or by the mounting frame that holds the devices together. The singulated devices will thus not be square together. When the electrode patterns are rotated with respect to the sides of the singulated sandwich devices, then they can be bonded together or mounted together to be square.

The term "printing" is used, since silkscreen printing is a common way of placing an electrode on the substrate. It will be understood that the proposed solution is not limited to silkscreen printing or other printing techniques, as a variety of deposition techniques can be used. Thin wire electrodes can be bonded, incorporated or otherwise attached. Electrodes can be opaque conductors or transparent as desired.

Figure 14:
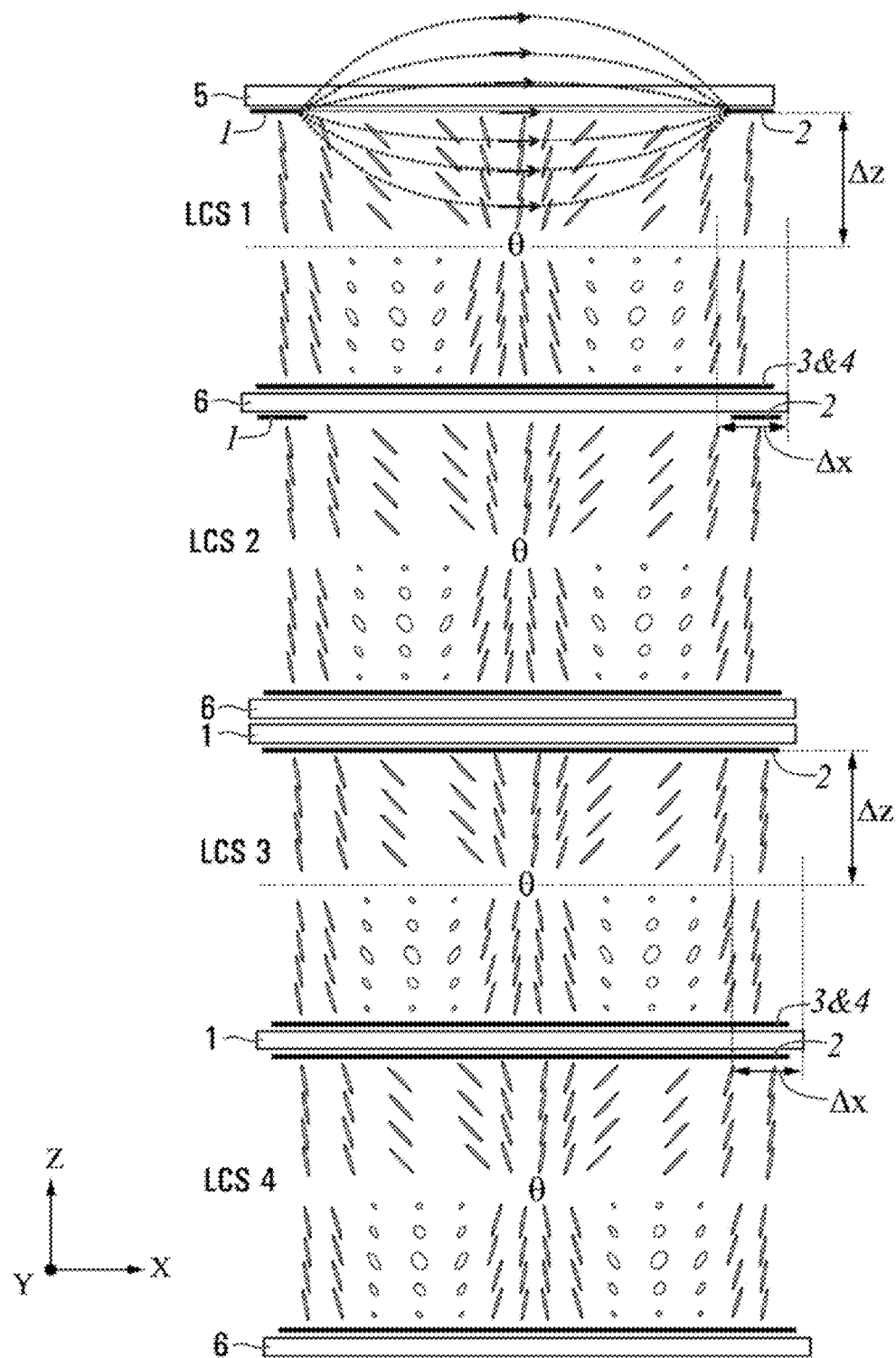
FIG. 14 is a schematic cross-sectional view of four LC sandwiches in which each sandwich has a homeotropic ground state LC alignment with the electrodes of the opposed cell substrates that are orthogonally arranged within each cell and in which there is a 45 degree rotation between the electrode orientation of the upper two sandwiches and the electrode orientation of the bottom two sandwiches.
Figure 15:
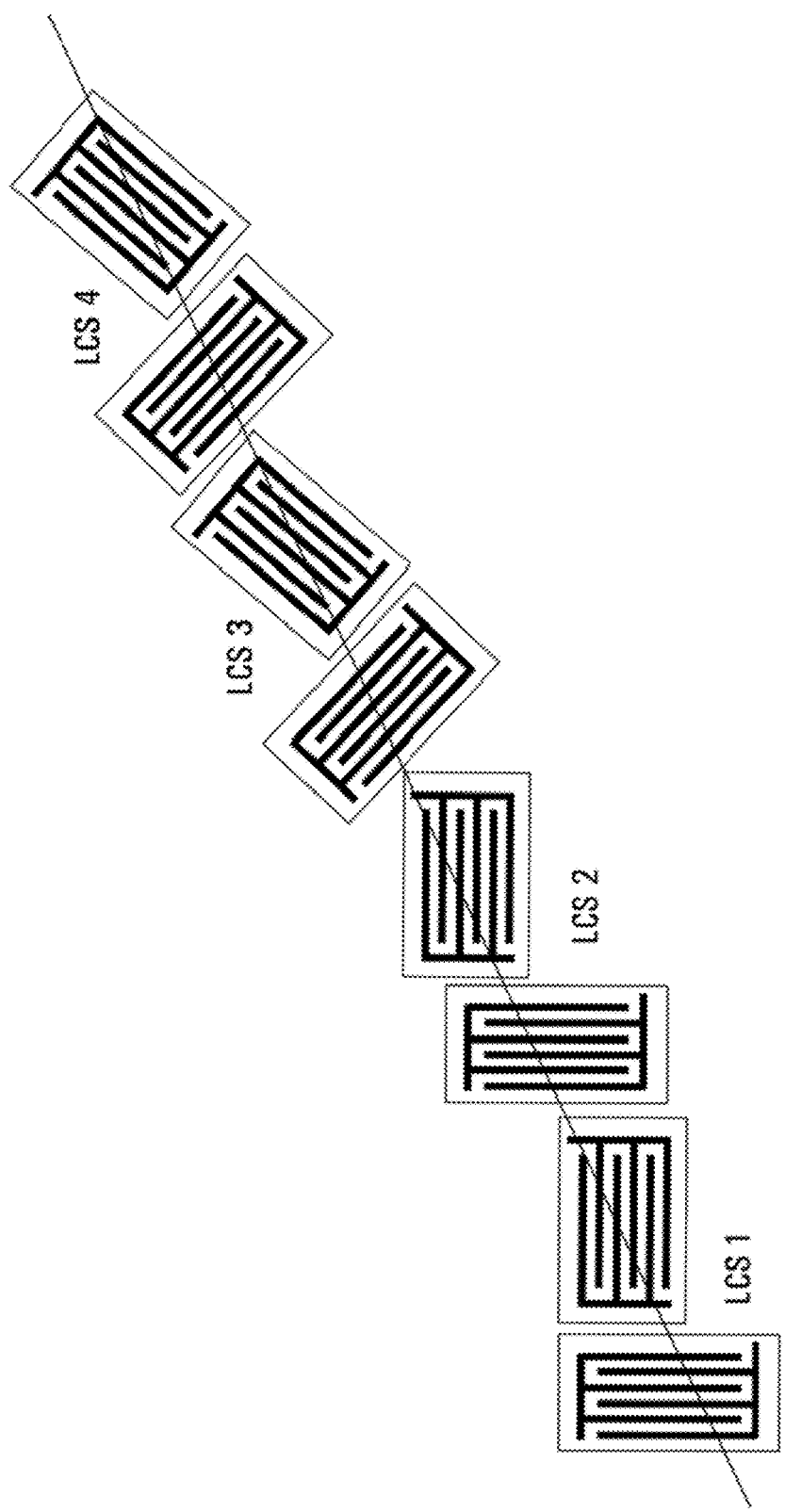
FIG. 15 is a schematic illustration of the electrode orientation of the four sandwiches according to FIG. 14.
Figure 16:
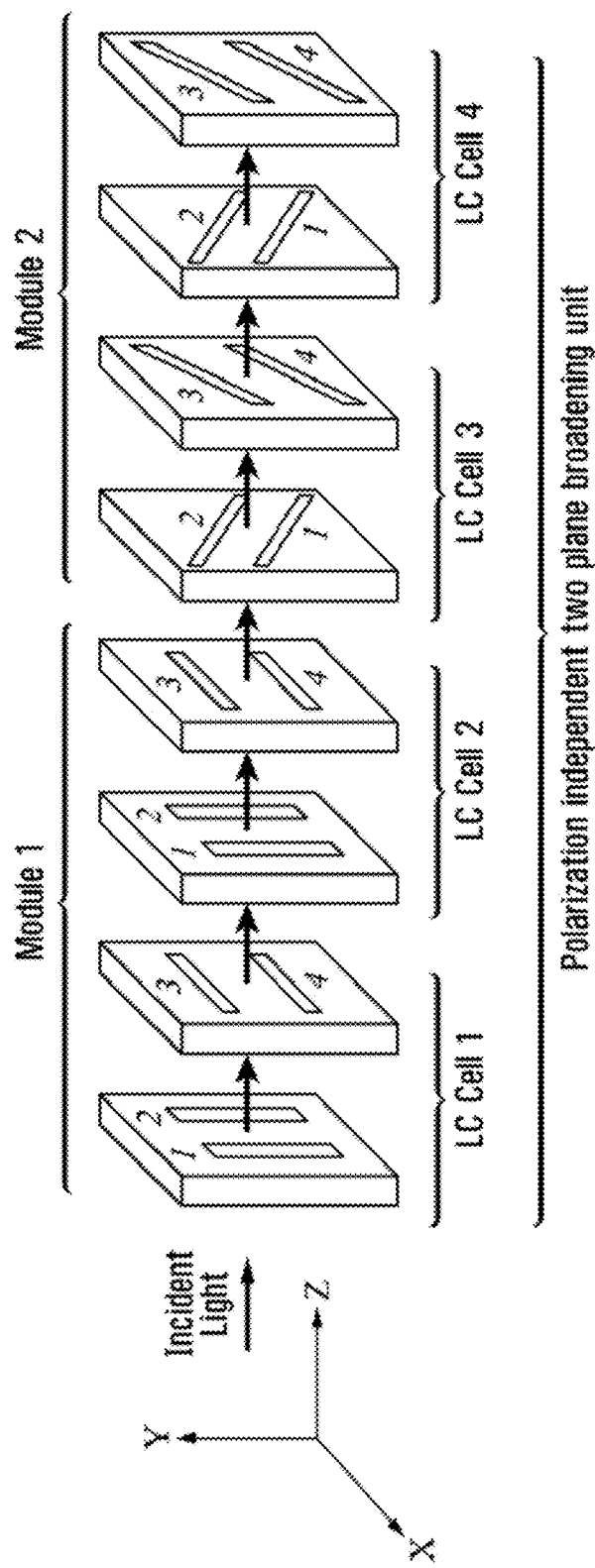
FIG. 16 is a schematic diagram according to FIG. 15 illustrating a polarization independent two (azimuthal) plane beam broadening device employing sequential beam broadening devices, such that the first orthogonal polarization directions affected by the first beam broadening device are oriented at about 45 degrees with respect to the second orthogonal polarization directions affected by the subsequent second beam broadening device.

The applicant has discovered that the intensity non-uniformity and color separation can become visible for light sources with very small divergence angle even if we use the above-mentioned modifications. The applicant found a way to mitigate this problem too. The embodiment of FIGS. 14 and 15 illustrate schematically a design in which four sandwiches of LC material having a homeotropic LC ground state and orthogonal electrodes on opposed substrates of each sandwich. As described with reference to FIG. 2A, two such sandwiches provide beam broadening in two directions, and the intensity uniformity of the beam broadening can be improved significantly using a small angle rotation between two sandwiches. Applicant has also found that an arrangement of four sandwiches (assembly of two pairs of sandwiches), wherein the first pair is composed of two sandwiches having electrodes that are either parallel or orthogonal to each other (whether or not a small angle offset is provided between the two sandwiches) and the second pair is composed of two sandwiches having electrodes that are oriented (rotationally offset) at approximately 45 degrees with respect to the first pair of sandwiches (whether or not a small angle offset is provided between the two sandwiches of the second pair) also improves beam intensity uniformity, as shown in FIG. 15 and FIG. 16. It will be appreciated that the ordering of sandwiches LCS1 to LCS4 can be varied from what is illustrated in FIG. 15 and FIG. 16.

While the invention has been illustrated and described with reference to preferred embodiments thereof, it will be recognized by those skilled in the art that various changes in form and detail may be made therein without departing from the spirit and scope of the invention as defined by the appended claims.

What is claimed is:

1. A liquid crystal (LC) beam broadening device comprising:
   a first LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate and said first LC sandwich causes broadening of a first linear polarization of light in two directions; and
   a second LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate and said second LC sandwich causes broadening of a second linear polarization of light in two directions.

2. The LC beam broadening device as defined in claim 1, wherein the electrode segments of said first LC sandwich are rotationally offset from being parallel or orthogonal with respect to the electrode segments of said second LC sandwich by about 2 to about 8 degrees.

3. The LC beam broadening device as defined in claim 1, wherein said first LC sandwich and said second LC sandwich share a common substrate.

4. The LC beam broadening device as defined in claim 2, wherein said rotational offset is about 5 degrees.

5. The LC beam broadening device as defined in claim 1, wherein said arrangement of parallel electrode segments on each substrate comprise a uniform arrangement of parallel electrodes.

6. The LC beam broadening device as defined in claim 1, wherein said arrangement of parallel electrode segments on each substrate comprise parallel electrodes in regions wherein said parallel electrodes in said regions have different orientation directions.

7. The LC beam broadening device as defined in claim 6, wherein said regions comprise four quadrants, said different orientation directions comprising 0, 45, 90 and 135 degree relative orientation directions.

8. A liquid crystal (LC) beam broadening device comprising:
   a first LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate;
   a second LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate;
   a third LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate;
   a fourth LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate; and
   wherein the electrode segments of said first LC sandwich are rotationally offset from being parallel or orthogonal with respect to the electrode segments of said second LC sandwich by 0 to about 8 degrees, the electrode segments of said third LC sandwich are rotationally offset from being parallel or orthogonal with respect to the electrode segments of said fourth LC sandwich by 0 to about 8 degrees, and the electrode segments of said second LC sandwich are rotationally offset with respect to the electrode segments of said third LC sandwich by approximately 45 degrees.

9. The LC beam broadening device as defined in claim 8, wherein said rotational offset of 0 to 8 degrees is about 2 to about 8 degrees.

10. The LC beam broadening device as defined in claim 9, wherein said rotational offset of 0 to 8 degrees is about 5 degrees.

11. The LC beam broadening device as defined in claim 8, wherein said first LC sandwich, said second LC sandwich, said third LC sandwich and said fourth LC sandwich share at least one common substrate.

12. The LC beam broadening device as defined in claim 8, wherein said arrangement of parallel electrode segments on each substrate comprise a uniform arrangement of parallel electrodes.

13. The LC beam broadening device as defined in claim 8, wherein said arrangement of parallel electrode segments on each substrate comprise parallel electrodes in regions wherein said parallel electrodes in said regions have different orientation directions.

14. The LC beam broadening device as defined in claim 13, wherein said regions comprise four quadrants, said different orientation directions comprising 0, 45, 90 and 135 degree relative orientation directions.

15. A liquid crystal (LC) beam broadening device comprising:
   four LC cells each having LC material contained within opposed front and back substrates to have a planar aligned ground state orientation, at least one of said substrates having an arrangement of parallel electrode segments for creating a spatial variation of LC orientation within the cells, one each of said four LC cells for each of two polarizations and for each of two orthogonal parallel electrode orientation;

wherein the electrode segments of at least one of said LC cells are rotationally offset from being parallel or orthogonal with respect to the electrode segments of at least one other of said LC cell by about 2 to about 8 degrees.

16. The LC beam broadening device as defined in claim 15, wherein said cells share at least one common substrate.

17. The LC beam broadening device as defined in claim 15, wherein said rotational offset is about 5 degrees.

18. The device as define in claim 15, wherein said planar aligned ground state is at an angle of about 45 degrees with respect to a direction of an electrode orientation in each of said four cells.

19. The LC beam broadening device as defined in claim 15, wherein said arrangement of parallel electrode segments on each substrate comprise a uniform arrangement of parallel electrodes.

20. The LC beam broadening device as defined in claim 15, wherein said arrangement of parallel electrode segments on each substrate comprise parallel electrodes in regions wherein said parallel electrodes in said regions have different orientation directions.

21. The LC beam broadening device as defined in claim 20, wherein said regions comprise four quadrants, said different orientation directions comprising 0, 45, 90 and 135 degree relative orientation directions.

22. A beam control device for shaping an output light beam, the beam control device being configured to receive an incident beam from a light source, the beam control device comprising:

at least one liquid crystal cell for modulating said incident beam as said incident beam propagates therethrough, each liquid crystal cell having: a pair of cell substrates separated by a cell thickness, a liquid crystal material filling, at least one alignment layer for ordering said liquid crystal material homeotropically with a director in a ground state alignment direction, a liquid crystal material, a first patterned electrode structure on said first one of said substrates having first independent electrodes for providing a first in-plane electric field at said first one of said substrates and a first spatial modulation of the liquid crystal material in a first zone near said first substrate and between said first independent electrodes of said first patterned electrode structure, and a second patterned electrode structure arranged at a cross-orientation with respect to said first patterned electrode structure on a second one of said substrates and having second independent electrodes for providing a second in-plane electric field at said second one of said substrates and a second spatial modulation of the liquid crystal material in a second zone near said second substrate and between said second independent electrodes of said second patterned electrode structure, wherein when said first and said second patterned electrode structures are powered, a twist in liquid crystal orientation arises in a third zone between said first zone and said second zone over at least a portion of an aperture of said device to provide a polarization rotation in light passing through said device.

23. The LC beam broadening device as defined in claim 22, wherein said first and said second patterned electrode structures comprise a uniform arrangement of parallel electrodes.

24. The LC beam broadening device as defined in claim 22, wherein said first and said second patterned electrode structures comprise parallel electrodes in regions wherein said parallel electrodes in said regions have different orientation directions.

25. The LC beam broadening device as defined in claim 24, wherein said regions comprise four quadrants, said different orientation directions comprising 0, 45, 90 and 135 degree relative orientation directions.

* * * * *